US006938202B1

United States Patent
Matsubayashi et al.

(10) Patent No.: US 6,938,202 B1
(45) Date of Patent: Aug. 30, 2005

(54) SYSTEM FOR RETRIEVING AND PRINTING NETWORK DOCUMENTS

(75) Inventors: Don Hideyasu Matsubayashi, Monterey, CA (US); Hideo Mizoguchi, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/465,835

(22) Filed: Dec. 17, 1999

(51) Int. Cl.[7] .............................................. G06F 7/00
(52) U.S. Cl. .................... 715/501.1; 715/526; 358/402; 358/403
(58) Field of Search ........................... 715/501.1, 526, 715/760; 358/402, 403; 345/760

(56) References Cited

U.S. PATENT DOCUMENTS

| | | | |
|---|---|---|---|
| 5,559,933 A | 9/1996 | Boswell ...................... 395/114 |
| 5,675,507 A | * 10/1997 | Bobo, II ..................... 709/206 |
| 5,804,803 A | 9/1998 | Cragun et al. .............. 235/375 |
| 5,819,015 A | 10/1998 | Martin et al. ............... 395/114 |
| 5,848,413 A | 12/1998 | Wolff .......................... 707/10 |
| 5,956,487 A | * 9/1999 | Venkatraman et al. ...... 709/218 |
| 6,184,996 B1 | * 2/2001 | Gase .......................... 358/1.15 |
| 6,707,574 B1 | * 3/2004 | Freeman et al. ............. 358/1.9 |

OTHER PUBLICATIONS

Kinkon@t ftp, "Frequently Asked Questions about Kinko's FTP site" (visited Jul. 7, 1999) <http://www.kinkos.com/kinkonet/ftporder_faq.html>.

* cited by examiner

Primary Examiner—Stephen Hong
Assistant Examiner—Matthew Ludwig
(74) Attorney, Agent, or Firm—Fitzpatrick, Cella, Harper & Scinto

(57) ABSTRACT

A method for providing print-by-reference functionality includes providing a web page from a printer's embedded web server to a web browser, receiving a URL entered into the provided web page, retrieving a printable document corresponding to the URL, and printing the retrieved document.

2 Claims, 26 Drawing Sheets

```
<head><title>/ - </title></head><body><H1>/ - </H1><hr>
```

```
<pre> 12/3/96  10:37 AM     14418677 <A HREF="/big.ps">big.ps</A><br>
6/3/96   1:08 AM   314344
<A HREF="/BOUKEN.JPG">BOUKEN.JPG</A><br>   11/14/97  5:05 PM
    1017591 <A
HREF="/bouken.pcl">bouken.pcl</A><br>  11/14/97  5:22 PM       3866574
<A
HREF="/bouken.ps">bouken.ps</A><br>  4/22/98  10:46 PM         59039 <A
HREF="/cbaloon.pcl">cbaloon.pcl</A><br>  4/22/98  10:56 PM      25038 <A
HREF="/guy.pcl">guy.pcl</A><br>  6/3/97  11:14 AM              9067 <A
HREF="/LICENSE.PDF">LICENSE.PDF</A><br>  6/3/96  12:42 AM
    170420 <A
HREF="/MACHIBOU.JPG">MACHIBOU.JPG</A><br>  11/14/97  6:15 PM
    804335 <A
HREF="/machibou.pcl">machibou.pcl</A><br>  11/14/97  5:18 PM
    3362865 <A
HREF="/machibou.ps">machibou.ps</A><br>  6/7/96  7:07 PM         9877 <A
HREF="/MICKEY.PS">MICKEY.PS</A><br>  7/10/97  5:18 PM         2260162
<A
HREF="/NETBIOS.PCL">NETBIOS.PCL</A><br>  8/6/99  2:23 PM
    81408 <A
HREF="/posta.doc">posta.doc</A><br>  8/24/99  7:53 PM          5393 <A
HREF="/posta.html">posta.html</A><br>  8/19/99  1:58 PM         6243 <A
HREF="/posta2.html">posta2.html</A><br>  2/17/98  9:18 PM        2004 <A
HREF="/potato50.bat">potato50.bat</A><br>  4/12/97  3:37 AM       141721
<A
HFEF="/PRESENT.JPG">PRESENT.JPG</A><br>  11/14/97  6:12 PM
    950883 <A
HFEF="/present.pcl">present.pcl</A><br>  11/14/97  5:14 PM       3097176
<A
HREF="/present.ps">present.ps</A><br>  6/3/96  1:40 PM           294591
<A
HREF="/RUGGEDP.JPG">RUGGEDP.JPG</A><br>  11/14/97  6:12 PM
    1227109 <A
HREF="/ruggedp.pcl">ruggedp.pcl</A><br>  11/14/97  5:20 PM
    3097174 <A
HREF="/ruggedp.ps">ruggedp.ps</A><br>  6/2/96  7:51 PM          169895
<A
HREF="/SANPO.JPG">SANPO.JPG</A><br>  11/14/97  6:13 PM
    561124 <A
HREF="/sanpo.pcl">sanpo.pcl</A><br>  11/14/97  5:13 PM          3097176
<A
HREF="/sanpo.ps">sanpo.ps</A><br>  12/1/95  8:56 M              78519 <A
HREF="/TIGER.PS">TIGER.PS</A><br>  8/10/99  5:31 PM              468 <A
HREF="/ufp.html">ufp.html</A><br></pre><hr></body>
```

FIG. 12

```
<P>
<A HREF="pdpbrowse.html?target_url=http://146.184.23.16:80/big.ps">big.ps</a><BR>
<A HREF="pdpbrowse.html?target_url=http://146.184.23.16:80/bouken.jpg">bouken.jpg</a><BR>
<A HREF="pdpbrowse.html?target_url=http://146.184.23.16:80/bouken.pcl">bouken.pcl</a><BR>
<A HREF="pdpbrowse.html?target_url=http://146.184.23.16:80/bouken.ps">bouken.ps</a><BR><
<A HREF="pdpbrowse.html?target_url=http://146.184.23.16:80/cbaloon.pcl">cbaloon.pcl</a><BR>
<A HREF="pdpbrowse.html?target_url=http://146.184.23.16:80/guy.pcl">guy.pcl</a><BR>
<A HREF="pdpbrowse.html?target_url=http://146.184.23.16:80/license.pdf">license.pdf</a><BR>
<A HREF="pdpbrowse.html?target_url=http://146.184.23.16:80/machibou.jpg">machibou.jpg</a><BR>
<A HREF="pdpbrowse.html?target_url=http://146.184.23.16:80/machibou.pcl">machibou.pcl</a><BR>
<A HREF="pdpbrowse.html?target_url=http://146.184.23.16:80/machibou.ps">machibou.ps</a><BR>
<A HREF="pdpbrowse.html?target_url=http://146.184.23.16:80/mickey.ps">mickey.ps</a><BR>
<A HREF="pdpbrowse.html?target_url=http://146.184.23.16:80/netbios.pcl">netbios.pcl</a><BR>
<A HREF="pdpbrowse.html?target_url=http://146.184.23.16:80/posta.doc">posta.doc</a><BR>
<A HREF="pdpbrowse.html?target_url=http://146.184.23.16:80/posta.html">posta.html</a><BR>
<A HREF="pdpbrowse.html?target_url=http://146.184.23.16:80/posta2.html">posta2.html</a><BR>
<A HREF="pdpbrowse.html?target_url=http://146.184.23.16:80/potato50.bat">potato50.bat</a><BR>
<A HREF="pdpbrowse.html?target_url=http://146 184.23.16:80/present.jpg">present.jpg</a><BR>
<A HREF="pdpbrowse.html?target_url=http://146.184.23.16:80/present.pcl">present.pcl</a><BR>
<A HREF="pdpbrowse.html?target_url=http://146.184.23.16:80/present.ps">present.ps</a><BR>
<A HREF="pdpbrowse.html?target_url=http://146.184.23.16:80/ruggedp.jpg">ruggedp.jpg</a><BR>
<A HREF="pdpbrowse.html?target_url=http://146.184.23.16:80/ruggedp.pcl">ruggedp.pcl</a><BR>
<A HREF="pdpbrowse.html?target_url=http://146.184.23.16:80/ruggedp.ps">ruggedp.ps</a><BR>
<A HREF="pdpbrowse.html?target_url=http://146.184.23.16:80/sanpo.jpg">sanpo.jpg</a><BR>
<A HREF="pdpbrowse.html?target_url=http://146.184.23.16:80/sanpo.pcl">sanpo.pcl</a><BR>
<A HREF="pdpbrowse.html?target_url=http://146.184.23.16:80/sanpo.ps">sanpo.ps</a><BR>
<A HREF="pdpbrowse.html?target_url=http://146.184.23.16:80/tiger.ps">tiger.ps</a><BR>
<A HREF="pdpbrowse.html?target_url=http://146.184.23.16:80/ufp.html">ufp.html</a><BR>

</P>
</BODY>
</HTML>
```

FIG. 14

```
<P>
<A href="pdpbrowse.html?target_url=ftp://anonymous:anonymous@ftp.microsoft.com/./bussys">bussys<BR></A>
<A
href="pdpbrowse.html?target_url=ftp://anonymous:anonymous@ftp.microsoft.com/./deskapps">deskapps<BR></A
>
<A
href="pdpbrowse.html?target_url=ftp://anonymous:anonymous@ftp.microsoft.com/./developr">developr<BR></A>
<A
href="pdpbrowse.html?target_url=ftp://anonymous:anonymous@ftp.microsoft.com/./dirmap.htm">dirmap.htm<BR>
</A>
<A
href="pdpbrowse.html?target_url=ftp://anonymous:anonymous@ftp.microsoft.com/./dirmap.txt">dirmap.txt<BR></
A>
<A
href="pdpbrowse.html?target_url=ftp://anonymous:anonymous@ftp.microsoft.com/./Disclaim1.txt">Disclaim1.txt<B
R></A>
<A
href="pdpbrowse.html?target_url=ftp://anonymous:anonymous@ftp.microsoft.com/./disclaimer.txt">Disclaimer.txt<
BR></A>
<A
href="pdpbrowse.html?target_url=ftp://anonymous:anonymous@ftp.microsoft.com/./HOMEMM.old">HOMEMM.old
<BR></A>
<A
href="pdpbrowse.html?target_url=ftp://anonymous:anonymous@ftp.microsoft.com/./KBHelp">KBHelp<BR></A>
<A href="pdpbrowse.html?target_url=ftp://anonymous:anonymous@ftp.microsoft.com/./ls-IR.txt">ls-
IR.txt<BR></A>
<A href="pdpbrowse.html?target_url=ftp://anonymous:anonymous@ftp.microsoft.com/./ls-IR.Z">ls-IR.Z<BR></A>
<A href="pdpbrowse.html?target_url=ftp://anonymous:anonymous@ftp.microsoft.com/./LS-LR.ZIP">LS-
LR.ZIP<BR></A>
<A
href="pdpbrowse.html?target_url=ftp://anonymous:anonymous@ftp.microsoft.com/./peropsys">peropsys<BR></A>
<A
href="pdpbrowse.html?target_url=ftp://anonymous:anonymous@ftp.microsoft.com/./Products">Products<BR></A>
<A href="pdpbrowse.html?target_url=ftp://anonymous:anonymous@ftp.microsoft.com/./ResKit">ResKit<BR></A>
<A
href="pdpbrowse.html?target_url=ftp://anonymous:anonymous@ftp.microsoft.com/./Services">Services<BR></A>
<A href="pdpbrowse.html?target_url=ftp://anonymous:anonymous@ftp.microsoft.com/./Softlib">Softlib<BR></A>
<A
href="pdpbrowse.html?target_url=ftp://anonymous:anonymous@ftp.microsoft.com/./solutions">solutions<BR></A>
</P>
```

FIG. 20

The following is a sample of the HTML generated by the embedded web server:

```html
<HTML>
<HEAD>
<title>Canon Browse For A Remote File</title>
</HEAD>
<BODY bgColor=white>
<P align=right>
<STRONG><FONT color=gray face="Times New Roman" size=3><A href="index.html">Embedded Web Server</A>
<BR>
Status: Idle</FONT></STRONG>
<BR>
</P>
<P align=center>
<STRONG>
<FONT color=mediumblue face="Times New Roman"size=5 style="FONT-SIZE: x-large">
Remote Browsing</FONT>
</STRONG>
</P>
<P>
<STRONG>
<FONT face="Times New Roman" size=3>
Current Path: mail.cissc.canon.com/<BR>
</FONT>
</STRONG>
</P>

<P>
<B>No.</B> 1<BR><B>Size:</B>1999<BR><B>Date:</B> Mon, 30 Aug 1999 12:36:09 – 0700<BR><B>From:</B>
"Matsubayashi, Don" [Don_Matsubayashi@cissc.canon.com]<BR><B>Subject:</B>POSTA <BR> <B>Number of
Hyperlinks:</B> 3<BR> <A
href="pdp.html?target_url=pop3://cis\dmatsuba:password@mail.cissc.canon.com/1">Print this message</A>
      <A
href="pdpview.html?target_url=pop3://cis\dmatsuba:password@mail.cissc.canon.com/1">View this
message</A><BR><B>Hyperlinks for Message No. 1:</B><BR><A
href="pdpbrowse.html?target_url=https://www.yahoo.com">Print this</A>   <A
href="https://www.yahoo.com">https://www.yahoo.com</A><BR><A
href="pdpbrowse.html?target_url=https://posta.tumbleweed.com/posta?x=1-42346-73548-5a6naou6">Print this:</A>
  <A href="https://posta.tumbleweed.com/posta?x=1-42346-73548-
5a6naou6">https://posta.tumbleweed.com/posta?x=1-42346-73548-5a6naou6</A><BR><A
href="pdpbrowse.html?target_url=http://www.posta.com">Print this:</A>   <A
href="http://www.posta.com">http://www.posta.com</A><BR><BR><B>No.</B> 2<BR><B>Size:</B>
1438<BR><B>Date:</B> Tue, 31 Aug 1999 00:39:47 –0700<BR><B>From:</B> "Purpura, Don"
[Don_Purpura@cissc.canon.com]<BR><B>Subject:</B> RE: MOIs 423, 430<BR> <B>Number of Hyperlinks:</B>
0<BR> <A href="pdp.html?target_url=pop3://cis\dmatsuba:password@mail.cissc.canon.com/2">Print this
message</A>       <A
href="pdpview.html?target_url=pop3://cis\dmatsuba:password@mail.cissc.canon.com/2">View this
message</A><BR><BR>
</P>
</BODY>
</HTML>
```

FIG. 25

SYSTEM FOR RETRIEVING AND PRINTING NETWORK DOCUMENTS

BACKGROUND OF THE INVENTION

1. Field of the Invention

The present invention relates to systems for printing documents and electronic mail located on the Internet or an intranet. In particular, the present invention concerns systems for printing using a Universal Resource Locator (URL) corresponding to a document or using electronic mailbox information corresponding to electronic mail.

2. Description of the Related Art

The Internet contains many documents available for downloading to a user's computer. To access these documents, a user activates a web browser application residing on the computer and browses the World Wide Web through selection of hyperlinks within accessed web pages and/or by inputting specific URLs into the web browser. Once a desired document is found, the user selects the document and the document is downloaded to the user's computer for printing.

Such documents are downloaded in a particular format, such as Adobe PDF, Adobe Postscript, Microsoft Word, or the like. In order to print the downloaded document, the user opens the document in its associated application and prints the document from the application.

Recently, Internet Printing Protocol (IPP) has been developed to provide a system for printing by reference to a document's corresponding URL. Using IPP, a URL is delivered from an IPP client (usually executing on the user's computer) to an IPP server (usually executing on a web server). Next, the IPP server retrieves a document corresponding to the received URL and, if necessary, renders the document into an appropriate printer format. The print-ready document is then delivered to a printer for printing. One advantage of this print-by-reference functionality is that a user can retrieve and print a document without having first to access the website in which the document exists.

One drawback of the foregoing IPP scheme is that both the user's computer and the web server require special IPP-enabling software to execute the IPP client and IPP server, respectively. However, many devices, such as Personal Digital Assistants (PDAs) have limited processing power and application storage space, therefore the IPP scheme unacceptably consumes already scarce resources. Moreover, the IPP client software most likely includes an interface for inputting the URL and therefore requires a user to learn an interface in addition to those already used by the user.

Another drawback of the foregoing systems for printing arises because some websites containing printable documents are only accessible using certain transfer protocols, such as File Transfer Protocol (FTP). As a result, using the first system described above, a web browser searching for Internet/intranet-located documents must be FTP-enabled, that is, the browser must be able to communicate using the FTP protocol. Again, for devices having scarce memory, such a browser, which also supports Hypertext Transfer Protocol (HTTP), consumes more memory and computing power than a browser supporting only one protocol.

Yet another drawback of the foregoing systems is that printable documents are often difficult to locate on Hypertext Markup Language (HTML) web pages browsed by a user, since many web pages contain visually distracting colors, images and animations.

Accordingly, what is needed is a system allowing print-by-reference functionality utilizing commonly-available software applications and a system in which print-by-reference functionality can be used to print documents located on websites supporting a transfer protocol which is not supported by a user's browser. In addition, what is needed is a system in which printable documents on remote websites are presented to a user in an easily-understandable format.

SUMMARY OF THE INVENTION

The present invention addresses the foregoing problems by providing a printer web page into which a user enters information corresponding to a network document or to electronic mail. Then, upon receipt of the information, the corresponding job is retrieved and printed. Accordingly, the present invention provides print-by-reference functionality to a user using the user's web browser, and without requiring special IPP software on the user's computer.

In a further aspect, the present invention provides a web page to a user into which the user enters a URL corresponding to a website. Notably, the transfer protocol used by the website is not supported by the user's browser. A web page is created based on the contents of the website, the web page including a link to a directory, a link to a document, or links to a directory and a document. As a result, a user can browse websites using a transfer protocol which is not supported by the user's browser. Accordingly, since the web browser is not required to support the transfer protocol of the website, a memory footprint of the browser can be reduced. Moreover, using the created web page, a user can more easily locate printable documents on the website.

In another aspect, the present invention is directed to a system in which a printer web page is provided to a web browser, a URL entered into the provided web page is received, the URL corresponding to a website having a transfer protocol not supported by the web browser, and a web page is created based on contents of the website, the web page including a link to a directory, a link to a document, or links to a directory and a document. If a link to a directory is selected, a new page is created including a link to a subdirectory, a document or linked to a subdirectory and a document.

By virtue of this aspect, a user can browse websites using a transfer protocol which is not supported by the user's browser. As mentioned above, a memory footprint of the browser can be thereby reduced. Moreover, using the created web page, a user can easily locate printable documents on the website.

In a further aspect, the present invention relates to a system in which a printer web page is provided, a URL is entered into the provided web page, and a web page is created based on contents of the website, the web page including hypertext links. A link is selected and a command is issued to access a directory corresponding to the link. If the command fails, a document file is retrieved corresponding to the link. If the command is successful, a new web page is created including hypertext links.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 12 is the raw HTML of the image shown in FIG. 11.

FIG. 14 is a view of HTML source code for a web page constructed using the FIG. 13 steps.

FIG. 20 is a view of HTML source code for a web page constructed using the FIG. 19 steps.

FIG. 25 is a view of HTML source code of a mail printing web page according to the present invention.

DETAILED DESCRIPTION OF THE PREFERRED EMBODIMENTS

Figure 1:
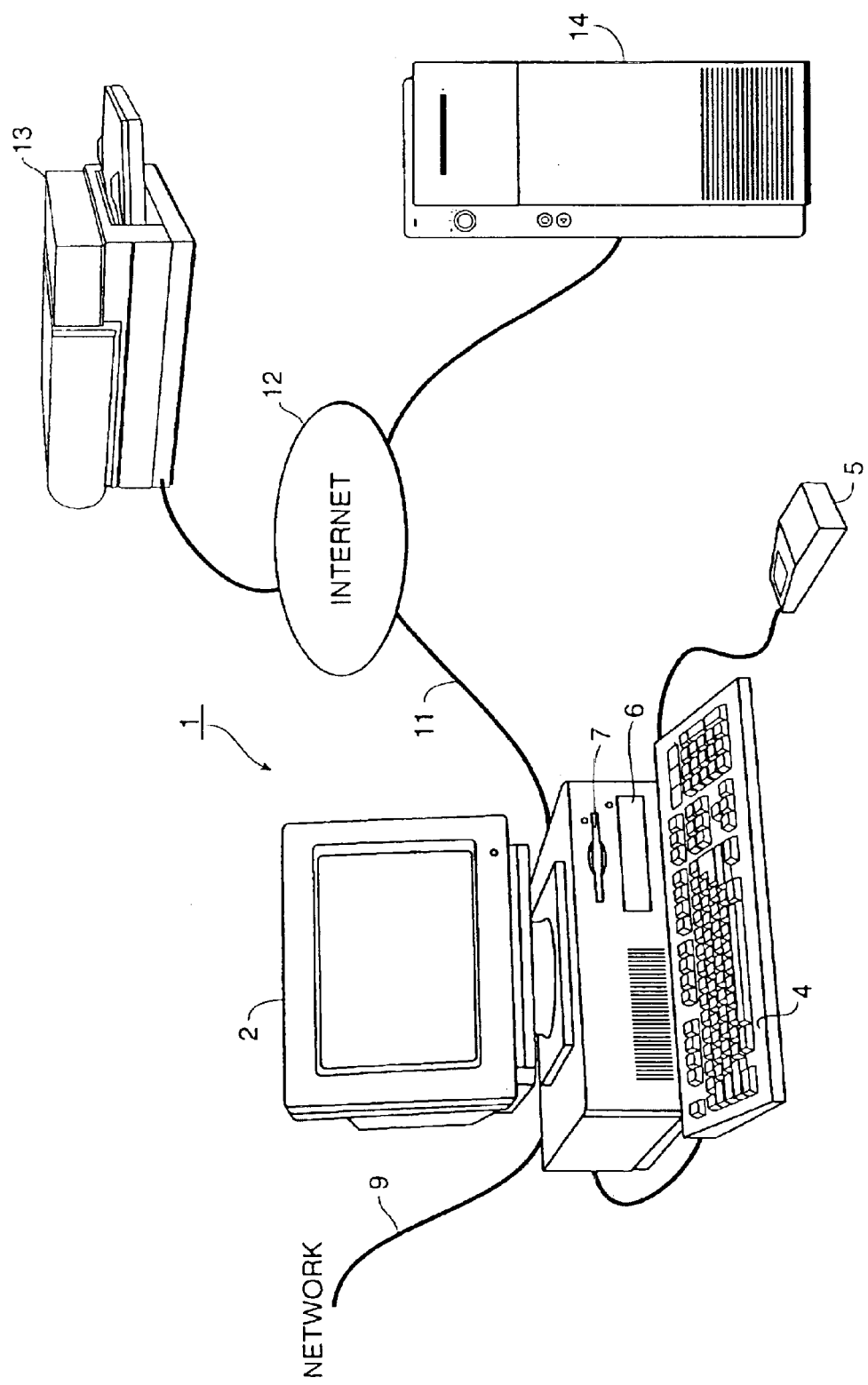
FIG. 1 is an outward view of a hardware configuration embodying the present invention.

FIG. 1 is an outward view of a representative computing system utilizing the present invention.

Computing equipment 1 is preferably an Intel® Pentium® based computer executing a windowing operating system such as Microsoft Windows98®. Computing equipment 1 includes display 2 for displaying images to a user, keyboard 4 for entering text and commands into appropriate fields displayed on display 2, and pointing device 5, such as a mouse, for pointing to, selecting and manipulating objects displayed on display 2.

Fixed disk 6 stores data files and computer-executable process steps of the windowing operating system and of other applications and device drivers executed by computing equipment 1.

Floppy disk drive 7 provides an interface to computing equipment 1 for reading data from and writing data to a floppy disk inserted therein. Using floppy disk drive 7, computer-executable process steps and/or data files may be input to computing equipment 1 and stored on fixed disk 6. Computer-executable process steps and data files may also be retrieved over a network via network connection 9, and over telephone line 11, which connects to Internet 12. These files are transferred thereto by web servers such as web server 14. Specifically, in response to a request for data and/or web pages, server 14 collects the required data, properly formats the data, and sends the data over Internet 12 to a web browser application executing in computing equipment 1.

Computing equipment 1 can also upload data to Internet 12 via telephone line 11. In this regard, computing equipment 1 may execute an electronic mail (e-mail) application to upload an e-mail message to Internet 12 for eventual delivery to an appropriate electronic mailbox.

Printer 13 is preferably a high-volume laser beam printer but may also be an inkjet, dot matrix or other type of printer. As will be discussed below, printer 13 is used to print documents and electronic mail located on Internet 12.

Figure 2:
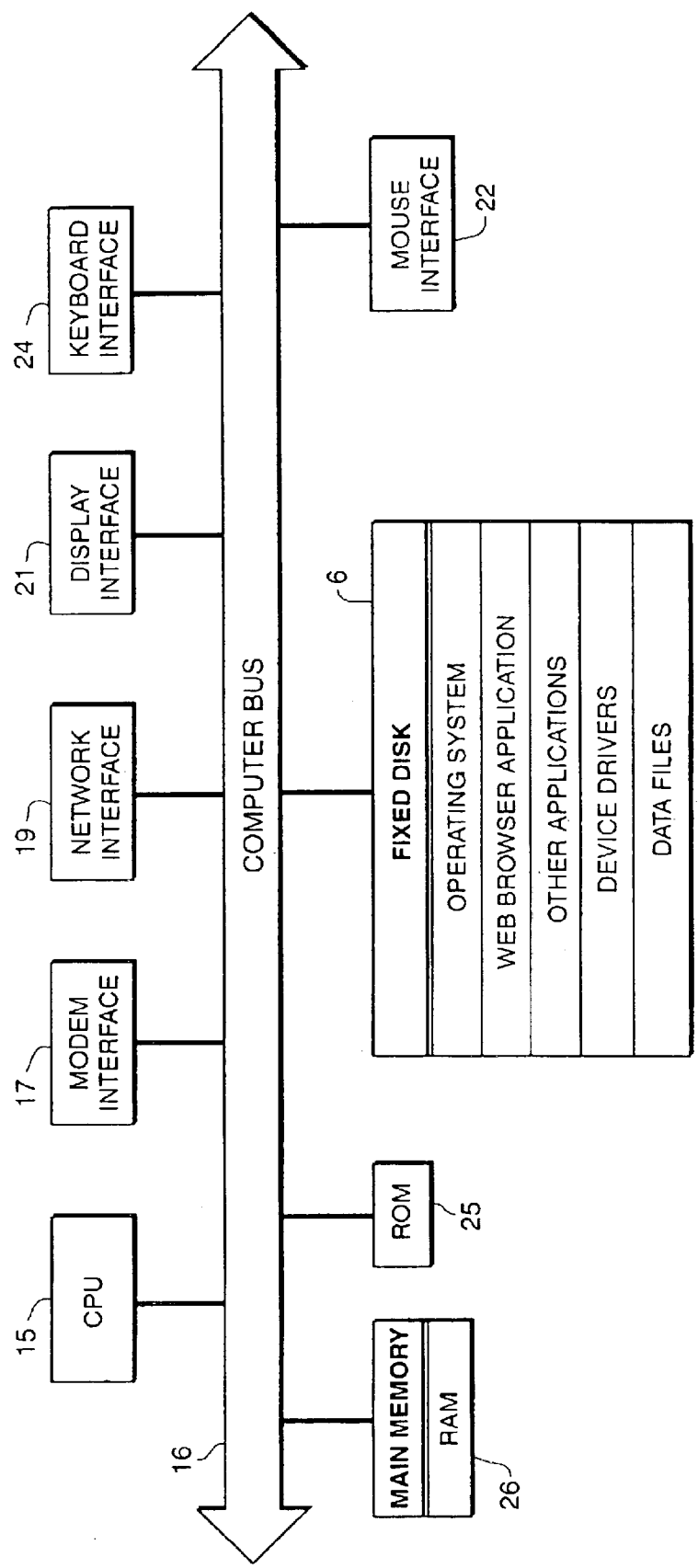
FIG. 2 is a block diagram of a personal computer internal architecture.

FIG. 2 is a block diagram of the internal architecture of computing equipment 1. Shown in FIG. 2 is CPU 15, which, as described above, is preferably a Pentium® processor. CPU 15 interfaces to computer bus 16, as does modem interface 17 for interfacing to telephone line 11, network interface 19 for interfacing to network connection 9 and display interface 21 for interfacing to display 2. Mouse interface 22, which interfaces to mouse 5, and keyboard interface 24, which interfaces to keyboard 4, are also connected to bus 16. In this regard, interfaces 17 to 24 allow computing equipment 1 to access the functionality of their corresponding components.

Also shown in FIG. 2 is disk 6, having stored thereon the aforementioned windowing operating system, and computer-executable process steps of a web browser application, other applications, device drivers and data files.

Read only memory (ROM) 25 stores invariant computer-executable process steps for basic system functions such as basic I/O, start-up, or reception of keystrokes from keyboard 4.

Random access memory (RAM) 26 provides CPU 15 with memory storage which can be accessed quickly. In this regard, computer-executable process steps of a web browser or other application are transferred from disk 6 over computer bus 16 to RAM 26 and executed therefrom by CPU 15.

Figure 3:
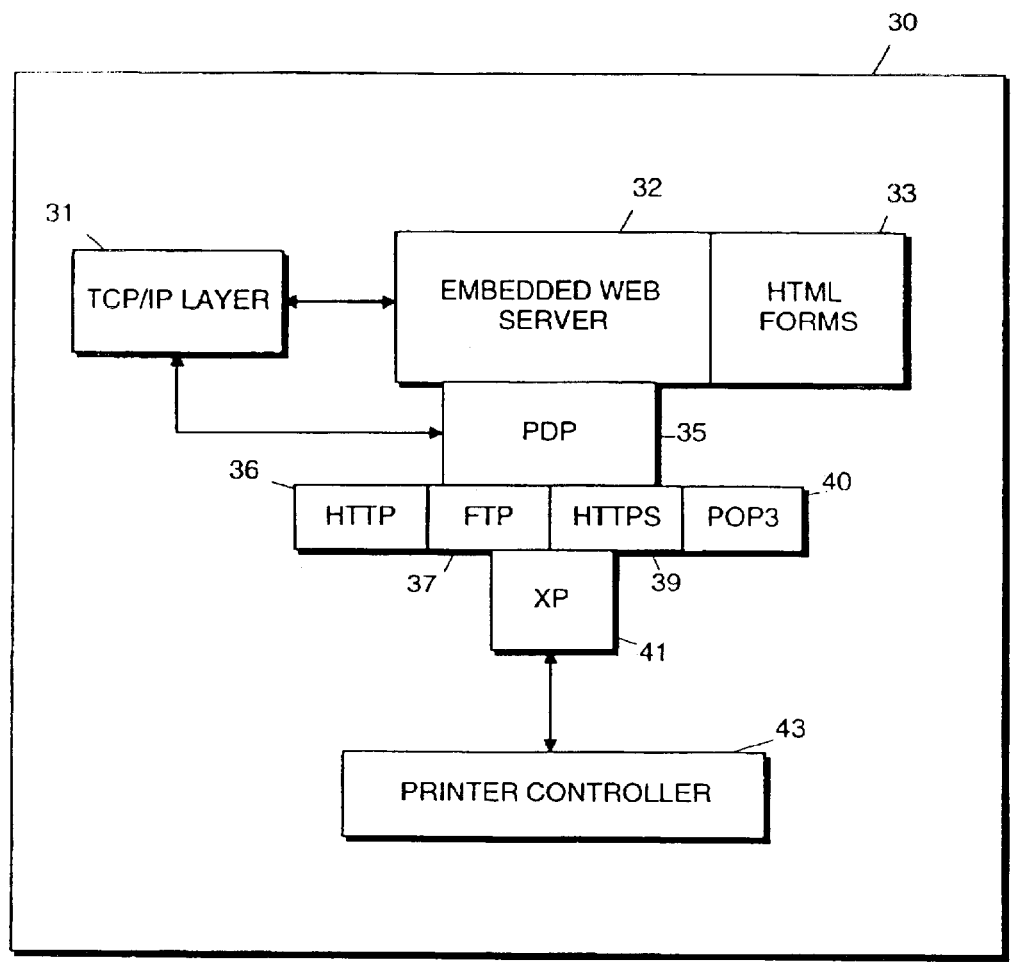
FIG. 3 is a functional block diagram of a printer expansion board according to the present invention.

FIG. 3 is a functional block diagram of network expansion board 30 which resides in printer 13. Included in board 30 are TCP/IP layer 31, which receives Internet Protocol (IP) packets from Internet 12, places them in a proper sequence, and parses data therefrom. TCP/IP layer 31 then ships the data to embedded web server 32, which is a Hypertext Transfer Protocol (HTTP) server capable of acting on the received data. One such action is to create appropriate Hypertext Markup Language (HTML) pages using HTML forms module 33.

Pull-down Printing (PDP) module 35 contains computer-executable process steps to retrieve a network document or electronic mail from Internet 12 based on a URL or mailbox information received from server 32, and to format the received data for display by a user's web browser. PDP module 35 utilizes functions provided by function libraries HTTP 36, FTP 37, HTTPS 39 and POP3 40 in order to send requests and interpret responses based on these protocols. In this regard, PDP module 35 is directly connected to TCP/IP layer 31.

Expansion Protocol (XP) module 41 receives requests to print from PDP module 35 and sends the requests to printer controller 43 to complete printing. In a preferred embodiment, board 30 includes functions and components other than those shown in FIG. 3, such as components for interpreting other network protocols and the like. It also should be noted that the components of FIG. 3 may also be located on a motherboard of printer 13.

Figure 4:
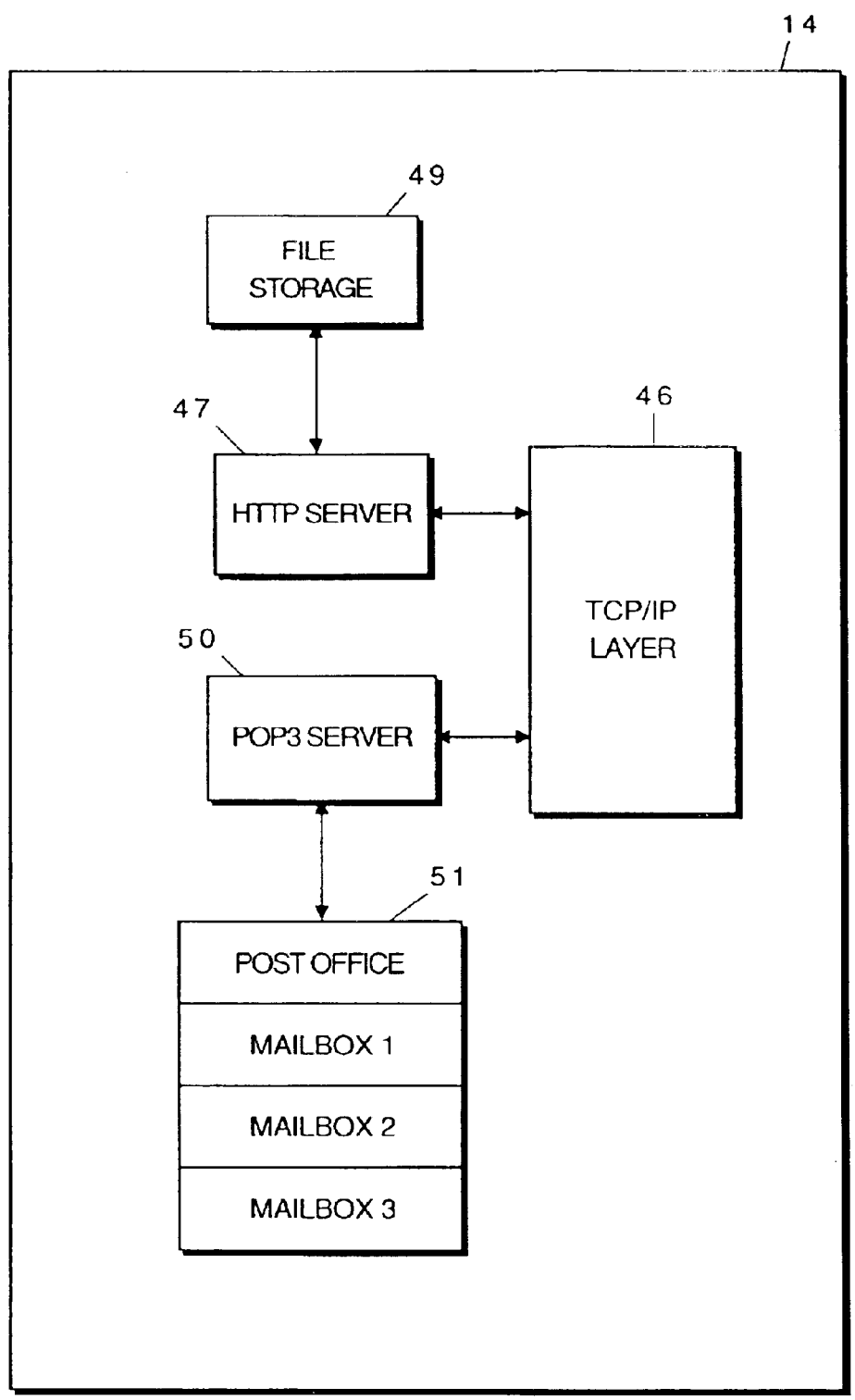
FIG. 4 is a functional block diagram of a web server.

FIG. 4 is a block diagram of several relevant components internal to server 14. Preferably, server 14 is connected to Internet 12 via an Internet connection (not shown), which may be a telephone line, a T1 line, a local area network connection or the like. In a case that server 14 connects directly to a local area network, the local area network is preferably connected to a router, which, in turn, is connected to Internet 12. In such a configuration, the router includes firewall software for prevention of unauthorized access to the local area network. It should be noted that although FIG. 4 shows HTTP server 47 and POP3 server 50 contained within the same server, namely, server 14, the POP3 server and the HTTP server are not required to be in the same server.

Data packets received over Internet 12 (IP packets) travel to TCP/IP layer 46, which functions similarly to TCP/IP layer 31. In response to received IP packets, HTTP server 47 constructs web pages from HTML templates and image files stored in file storage 49. Also stored in file storage 49 are documents, either in a printable format or another format, and Java applets, which are programs executable by a Java Virtual Machine contained in a browser application.

Upon receiving IP packets following the POP3 protocol, TCP/IP layer 46 parses the data therefrom and passes the data to POP3 server 50. POP3 server 50 is also connected to post office 51, which is a data repository storing data of electronic mailboxes. POP3 server 50 accesses post office 51 to respond to requests or instructions received by POP3 server 50 by sending appropriate data to a requestor via TCP/IP layer 46. Relevant details of the POP3 protocol will be discussed below.

Figure 5:
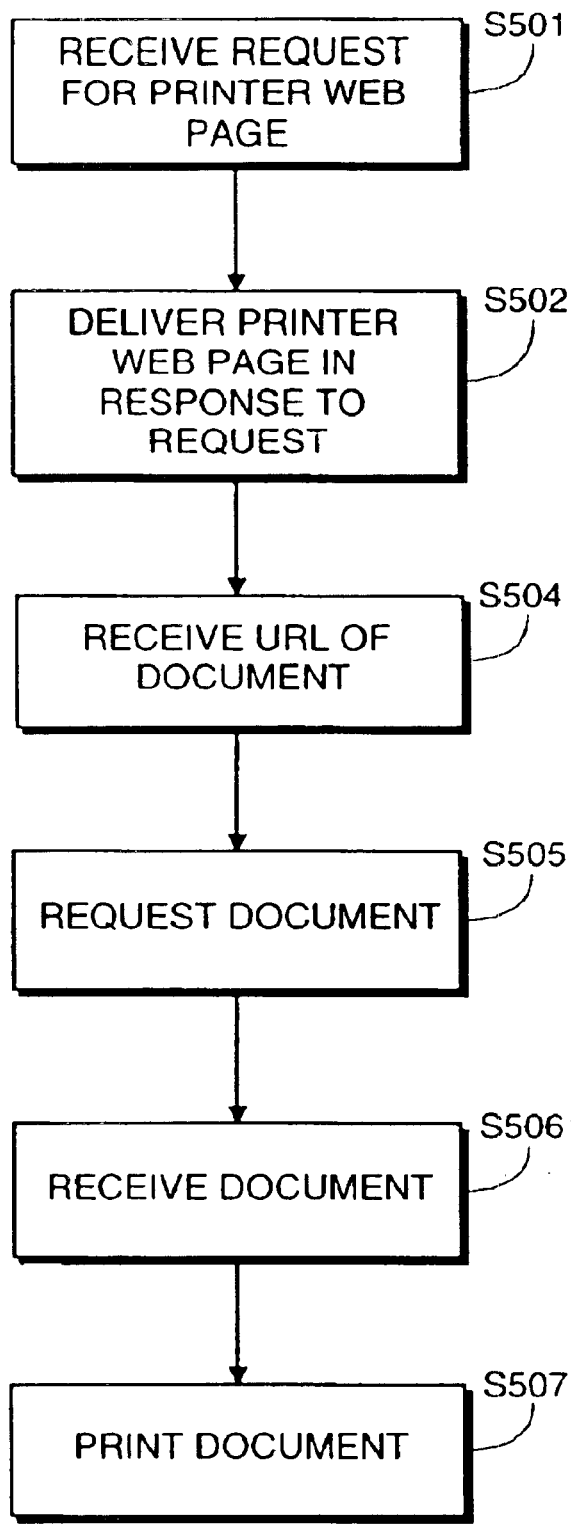
FIG. 5 is a flow diagram of computer-executable process steps to print an Internet-located document in accordance with the present invention.

FIG. 5 is a flow diagram of computer-executable process steps to print an Internet-located document according to the present invention. The process steps are preferably embodied in network expansion board 30.

In step S501, embedded web server 32 receives a request for a printer web page. The request is preferably provoked by entry of a URL corresponding to server 32 into a browser application executing on a user's computing system such as computing system 1. After such entry, the request is routed through Internet 12 to server 32. In response to the request, a printer web page is created using HTML forms 33 and delivered to the user in step S502.

Figure 6:
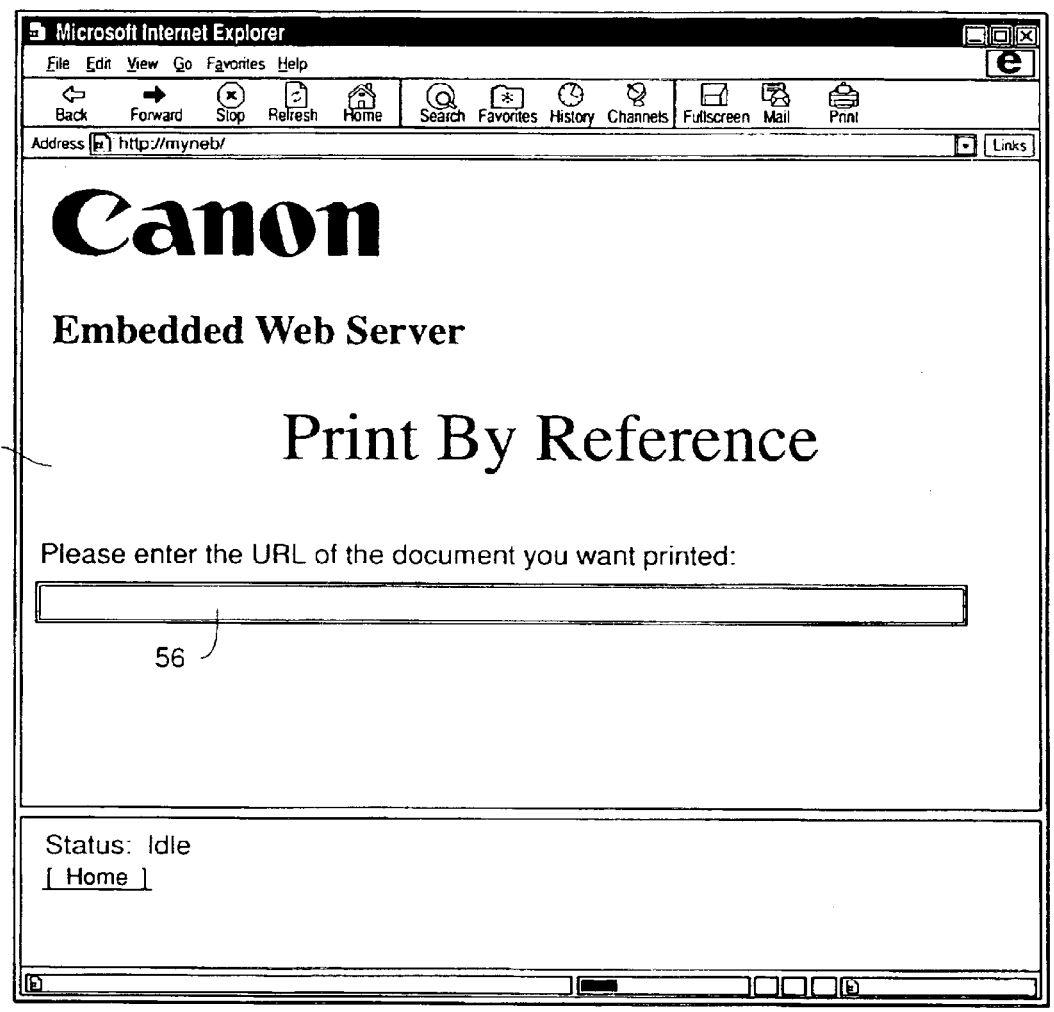
FIG. 6 is a view of a printer web page for use in conjunction with the present invention.
Figure 7:
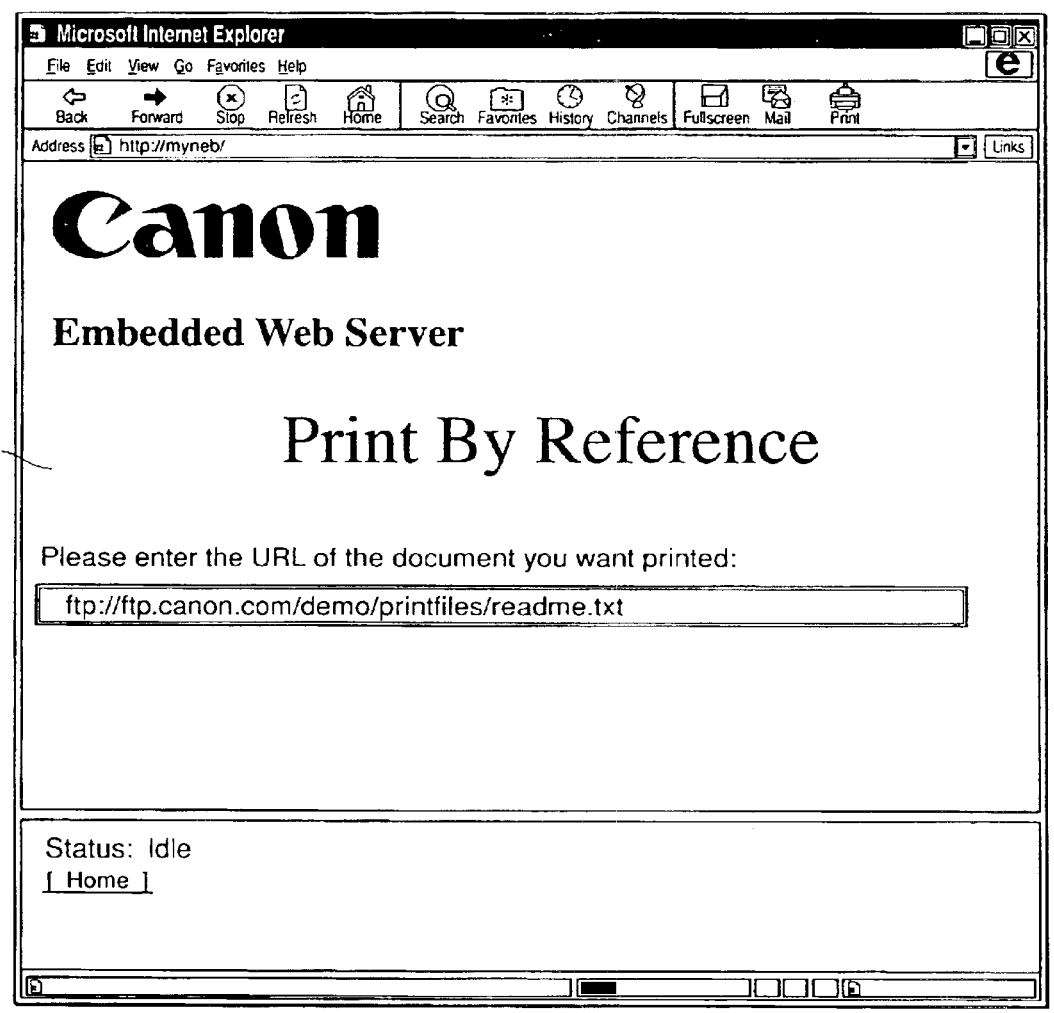
FIG. 7 is a view of a printer web page for use in conjunction with the present invention.

FIG. 6 shows printer web page 55 as displayed by a user's browser after step S502. As shown in the browser window, the URL corresponding to web server 32 in the present instance is http://myneb/. Page 55 also includes input area 56 for entering a URL of a network document to be printed. In this regard, FIG. 7 shows page 55 after entry of a URL corresponding to a network document.

After entry of the URL of a document in page 55, the URL is received by web server 32 in step S504. Web server 32 includes process steps to route data received along with a request for page 55 to PDP module 35. Therefore, PDP module 35 receives the URL and requests the document corresponding to the URL using functions of FTP library 37, since the received URL is an FTP site.

In response to the request from PDP module 35, the document is received in step S506. The document is then sent to printer controller 43 for printing in step S507. Preferably, the document is received in a print-rendered format in step S506. If not, printer controller 43 must render the document prior to printing.

Figure 8:
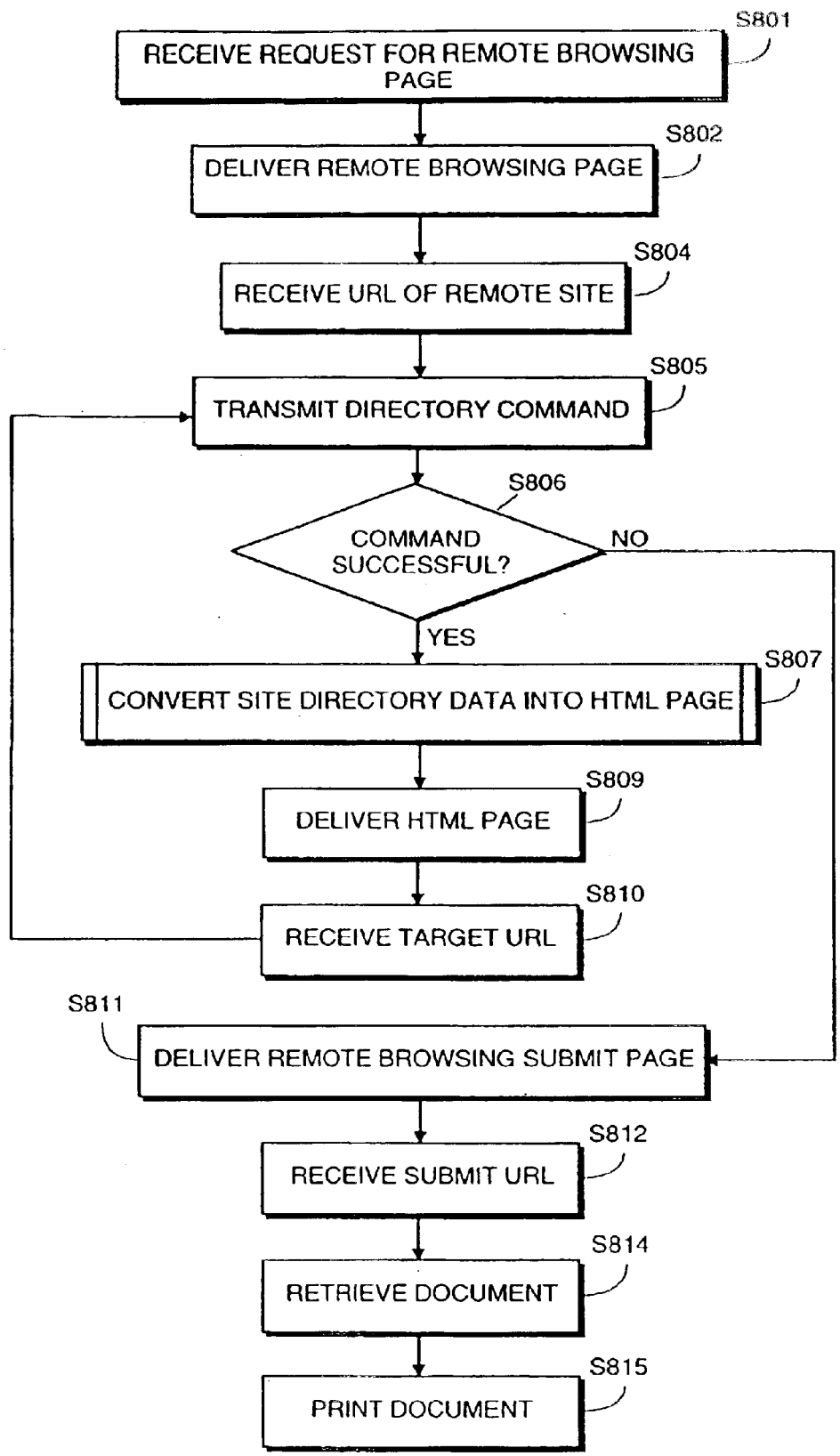
FIG. 8 is a flow diagram of computer-executable process steps to browse remote web sites for printable documents in accordance with the present invention.

FIG. 8 is a flow diagram of computer-executable process steps preferably embodied in expansion board 30 to browse a remote web site for printable documents.

Figure 9:
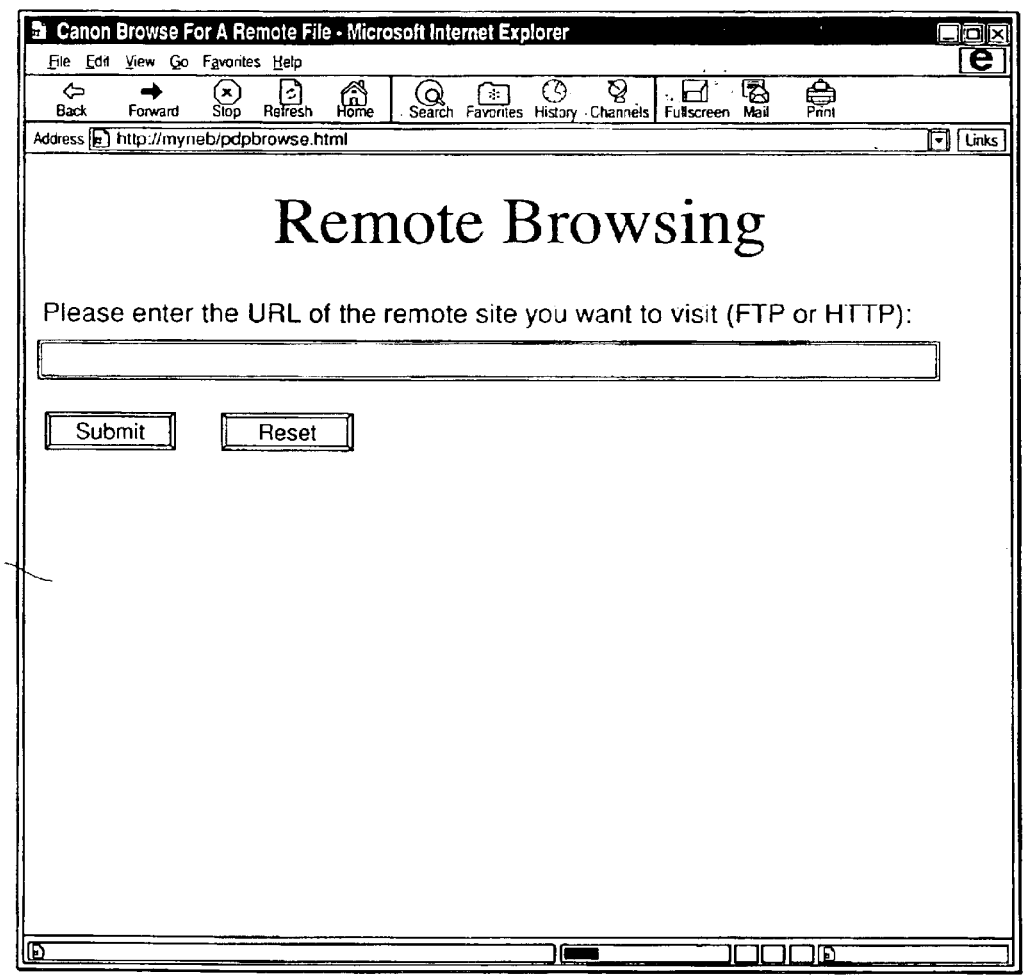
FIG. 9 is a view of a remote browsing printer web page for use in accordance with the present invention.

Flow begins at step S801, wherein web server 32 receives a request for a remote browsing web page due to a corresponding URL being entered into a user's browser application. Server 32 creates such a web page using HTML forms 33 and delivers the page to the requesting browser in step S802. FIG. 9 shows remote browsing page 60 delivered in step S802. As also shown, the URL used to request page 60 is http://myneb/pdpbrowse.html.

Figure 10:
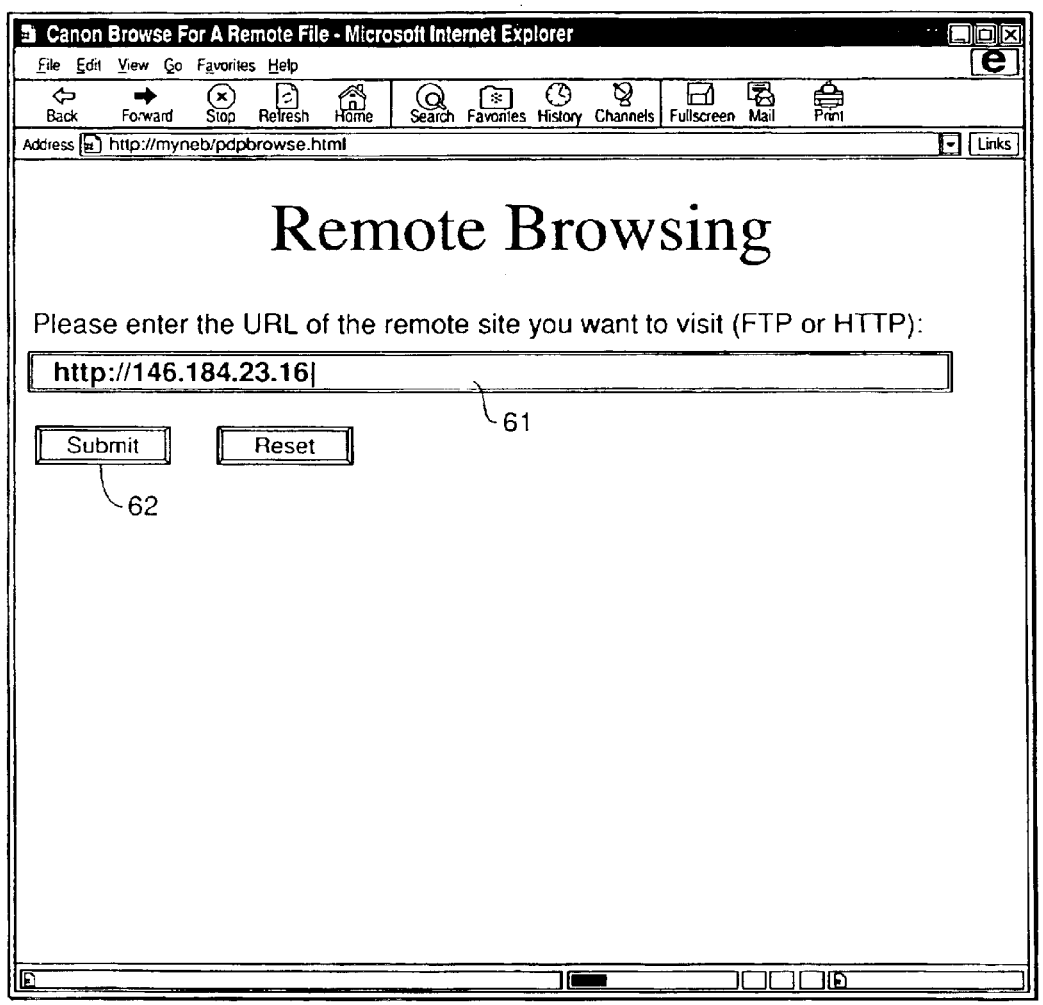
FIG. 10 is a view of a remote browsing printer web page for use in accordance with the present invention.

A user then enters a URL into input area 61 of page 60 as shown in FIG. 10. The URL is submitted to Internet 12 by selection of Submit icon 62. In step S804, the URL is received by server 32.

Figure 11:
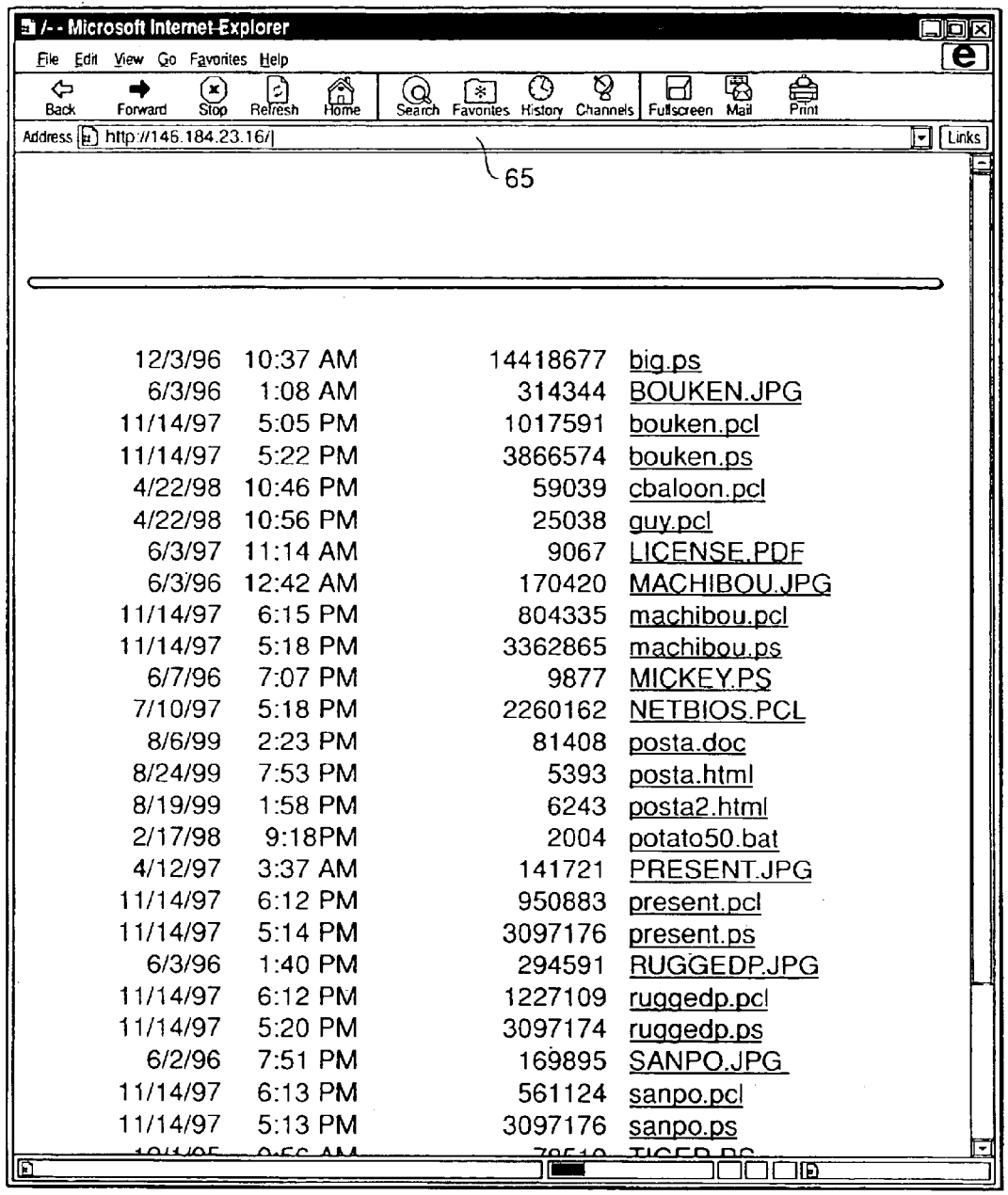
FIG. 11 is a view of a prior art web page displaying contents of a web server.

Diverting from the FIG. 8 flow, FIG. 11 shows contents of the web site specified by the URL entered into input area 61, as conventionally displayed by a web browser. In this regard, the URL was entered into URL input area 65 of the web browser and the directory contents of the URL were provided to the browser in the format shown in FIG. 11. The HTML source code corresponding to the FIG. 11 display is shown in FIG. 12. Considering FIG. 11, it can be seen that FIG. 11 contains much data not needed by a user to select a document for printing. Moreover, selecting an underscored link shown in FIG. 11 would not result in printing of an associated document.

Returning to FIG. 8, a Directory Open command is transmitted in step S805 using the URL received in step S804. If the command is successful, flow continues from step S806 to step S807, wherein directory data such as that shown in FIG. 12, which is received due to the Open Directory command, is converted into an HTML format according to the present invention in step S807.

Figure 13:
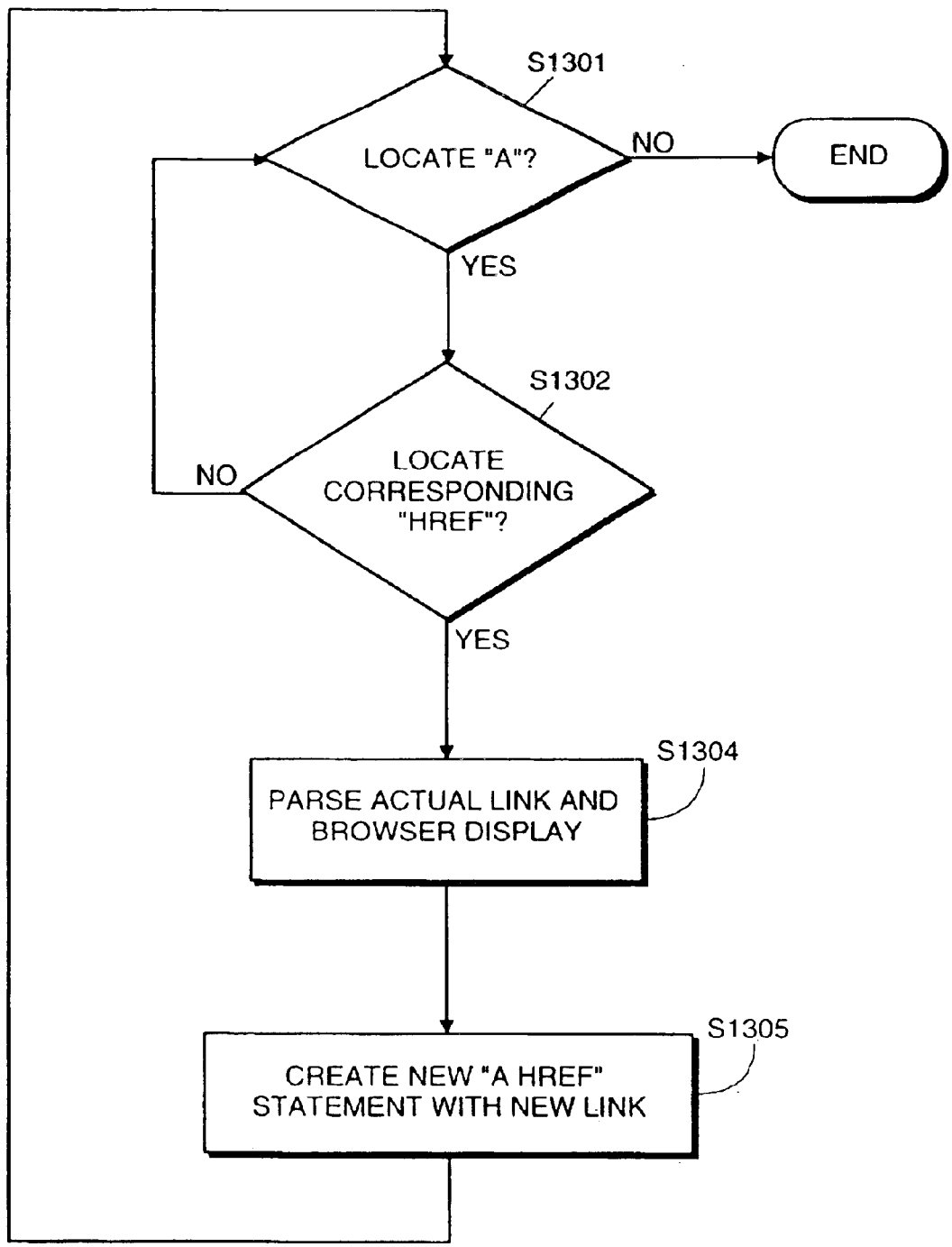
FIG. 13 is a flow diagram of computer-executable process steps to construct a server contents web page in accordance with the present invention.

FIG. 13 illustrates a flow diagram of computer-executable process steps used in step S807 to convert directory data from an HTTP-based web site into an HTML format according to the present invention.

In step S1301, the HTML directory data is searched for the HTML parameter "A". If the parameter is not located, the FIG. 13 process steps terminate. If so, flow continues to step S1302 to locate a corresponding "HREF" parameter. Considering the FIG. 12 example, the first qualifying parameter located during the FIG. 13 process correspond to the actual link "/big.ps" and the corresponding display big.ps.

After location of an HREF parameter in step S1302, the corresponding actual link and display information are parsed in step S1304. In the foregoing example, the parsed link is "/big.ps" and the display information is big.ps. Next, in step S1305, a new HREF statement is created, using the format <A HREF="pdpbrowse.html?target_url=(actual link)"> display information c/A>. In the present example, the statement created in step S1305 would read <A HREF=

"pdpbrowse.html?target_url=http://146.184.23.16:80/big.ps">big.ps</A>. Flow returns from step S1305 to step S1301 and continues as described above.

Figure 15:
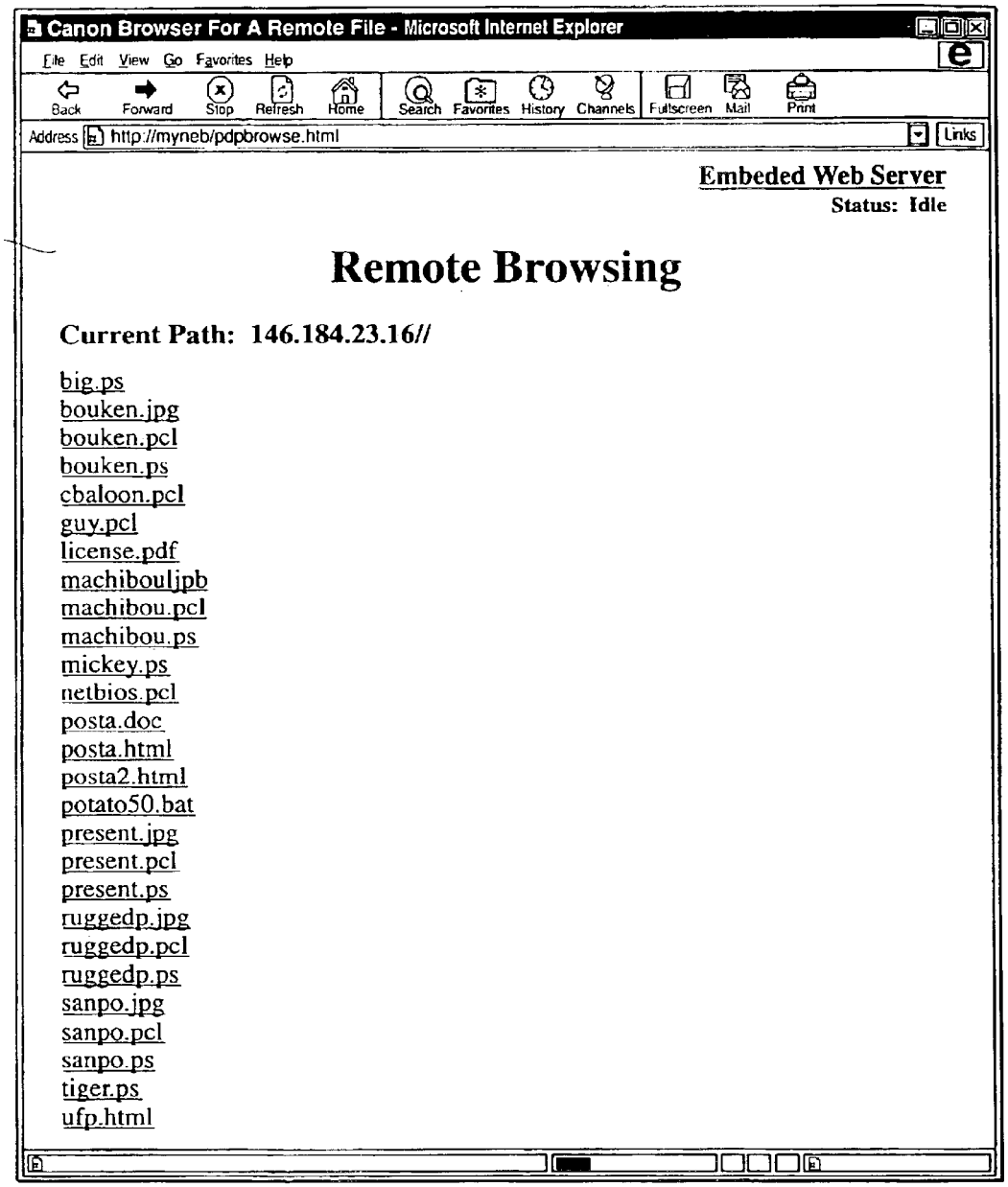
FIG. 15 is a view of a web page displayed by a web browser based on the FIG. 14 source code.

FIG. 14 shows HTML source code created by application of the FIG. 13 process steps to the FIG. 12 source code in step S807. The page is delivered in step S809. FIG. 15 shows remote browsing web page 70 displayed by a browser based on the FIG. 14 source code. It should be noted that selection of a hyperlink displayed in FIG. 11 merely results in an attempt to open a directory having a name identical to the hyperlink. In contrast, selection of a link of page 70 results in a target URL being passed in step S810 to remote browsing web page 60 "pdpbrowse.html" as explained with respect to FIG. 10. As a result, flow returns to step S805 to transmit an Open Directory command with respect to the new target URL.

Figure 16:
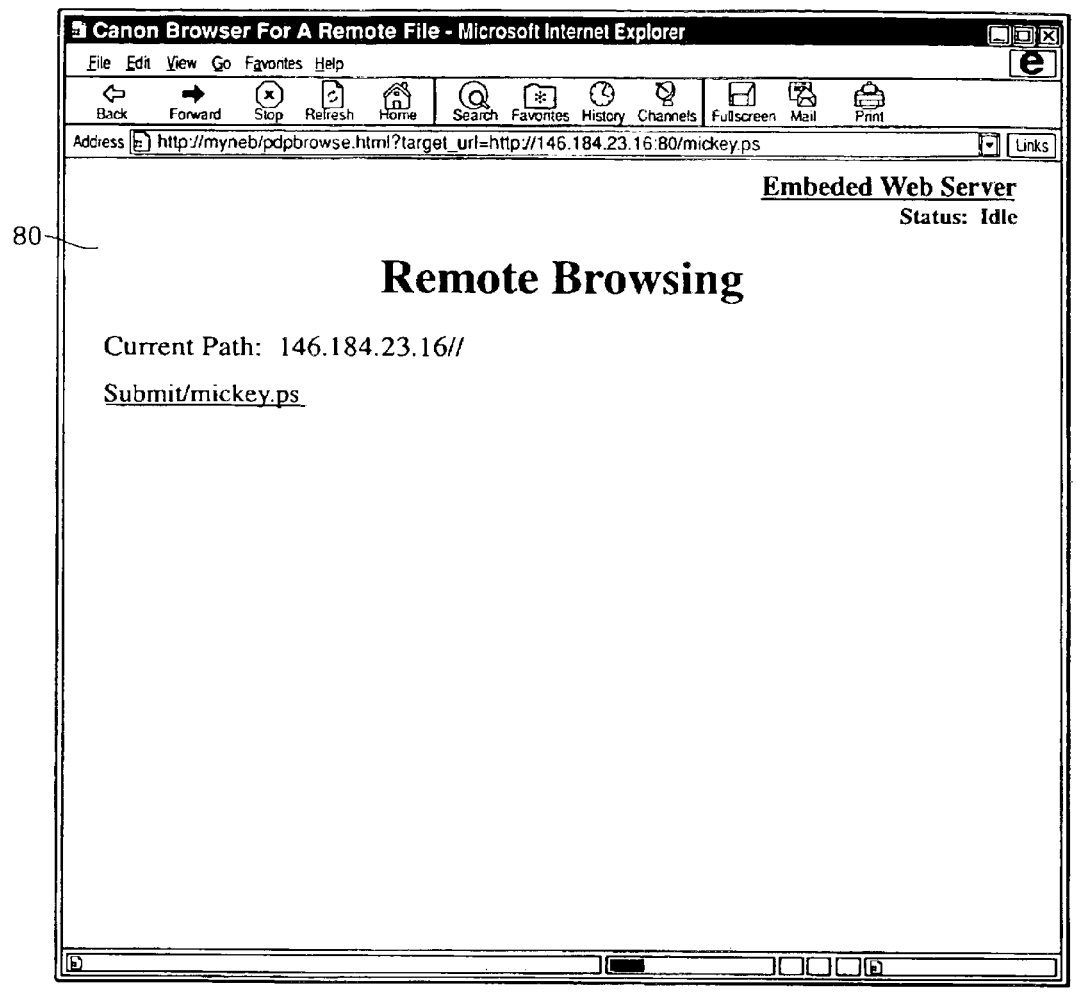
FIG. 16 is a view of a web page created in accordance with the present invention.

Next, if the command is not successful, it is assumed that the target URL corresponds to a document rather than a directory and submit page 80 of FIG. 16 is delivered in step S811. Upon selection of the displayed link, web page 55 of FIG. 6 is preferably passed the target URL. Therefore, as described above, web server 32 passes the target URL to PDP module 35 to retrieve a corresponding document in step S814 and to print the document in step S815.

Figure 17:
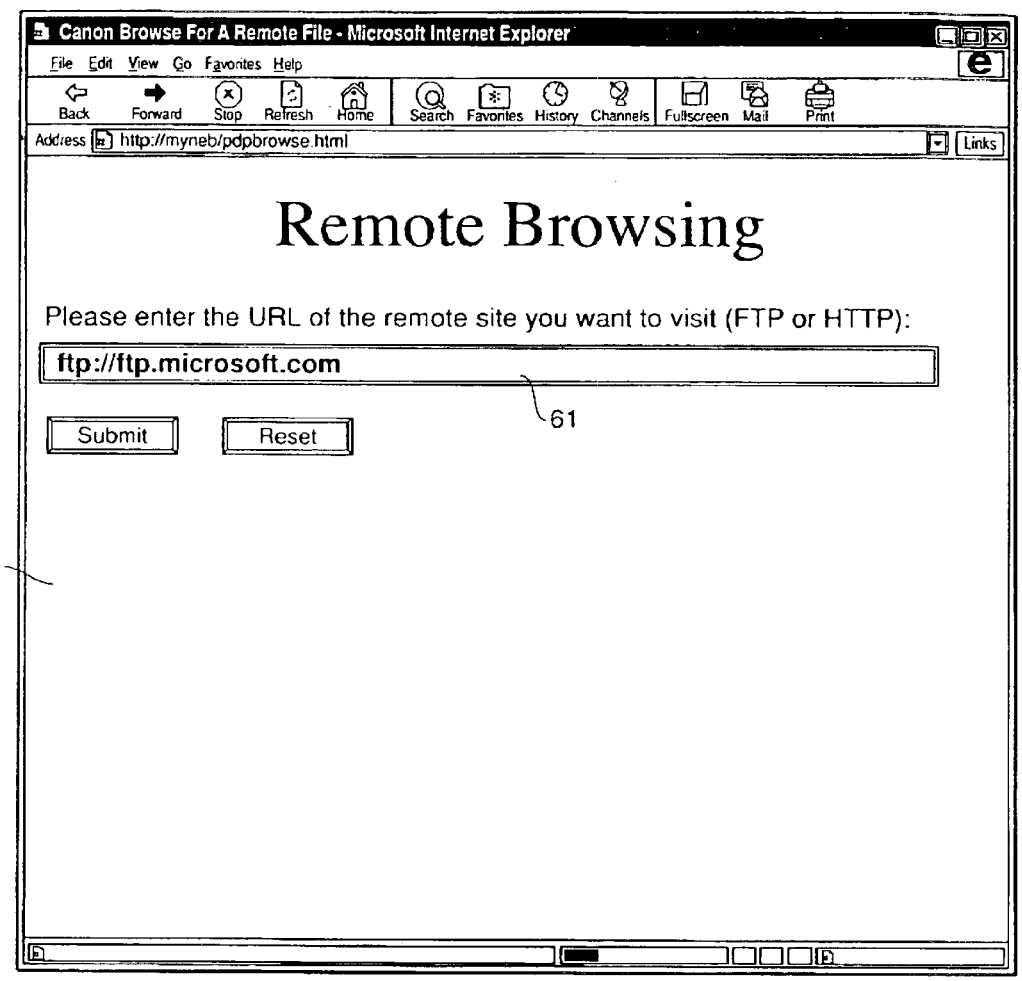
FIG. 17 is a view of a remote browsing printer web page for use in accordance with the present invention.

FIG. 17 shows remote browsing web page 60 having a URL of an FTP-enabled web site entered into input area 61. The URL is received in step S804 of FIG. 8 and flow proceeds as described above until step S807.

Figure 18:
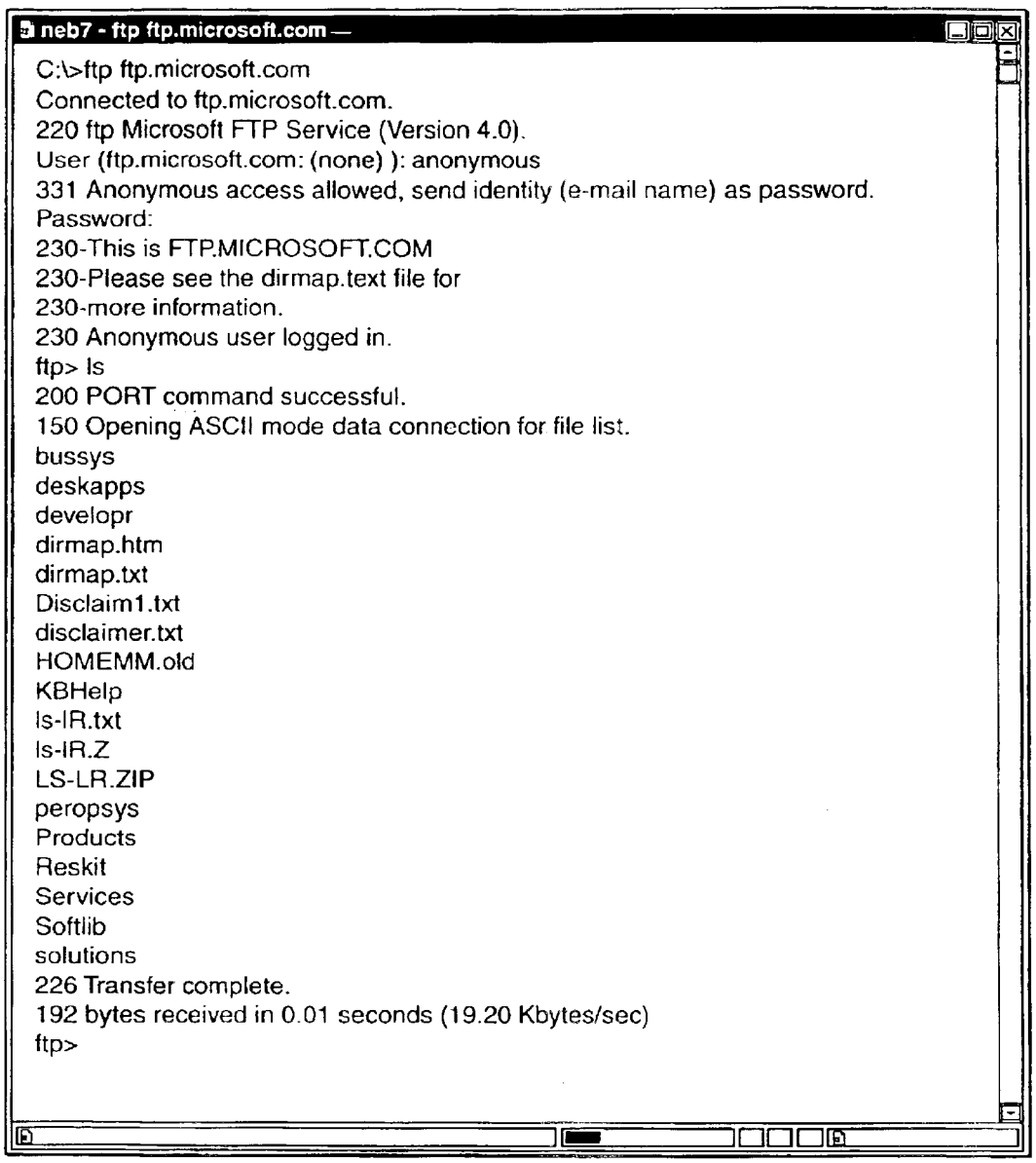
FIG. 18 is a list of files and directories stored on a server.

FIG. 18 shows a display of directory data from the FTP-enabled web site corresponding to the URL received in step S805. Since the FTP directory data is in a format different from the HTTP directory data, process steps different from those shown in FIG. 13 are needed to perform step S807.

Figure 19:
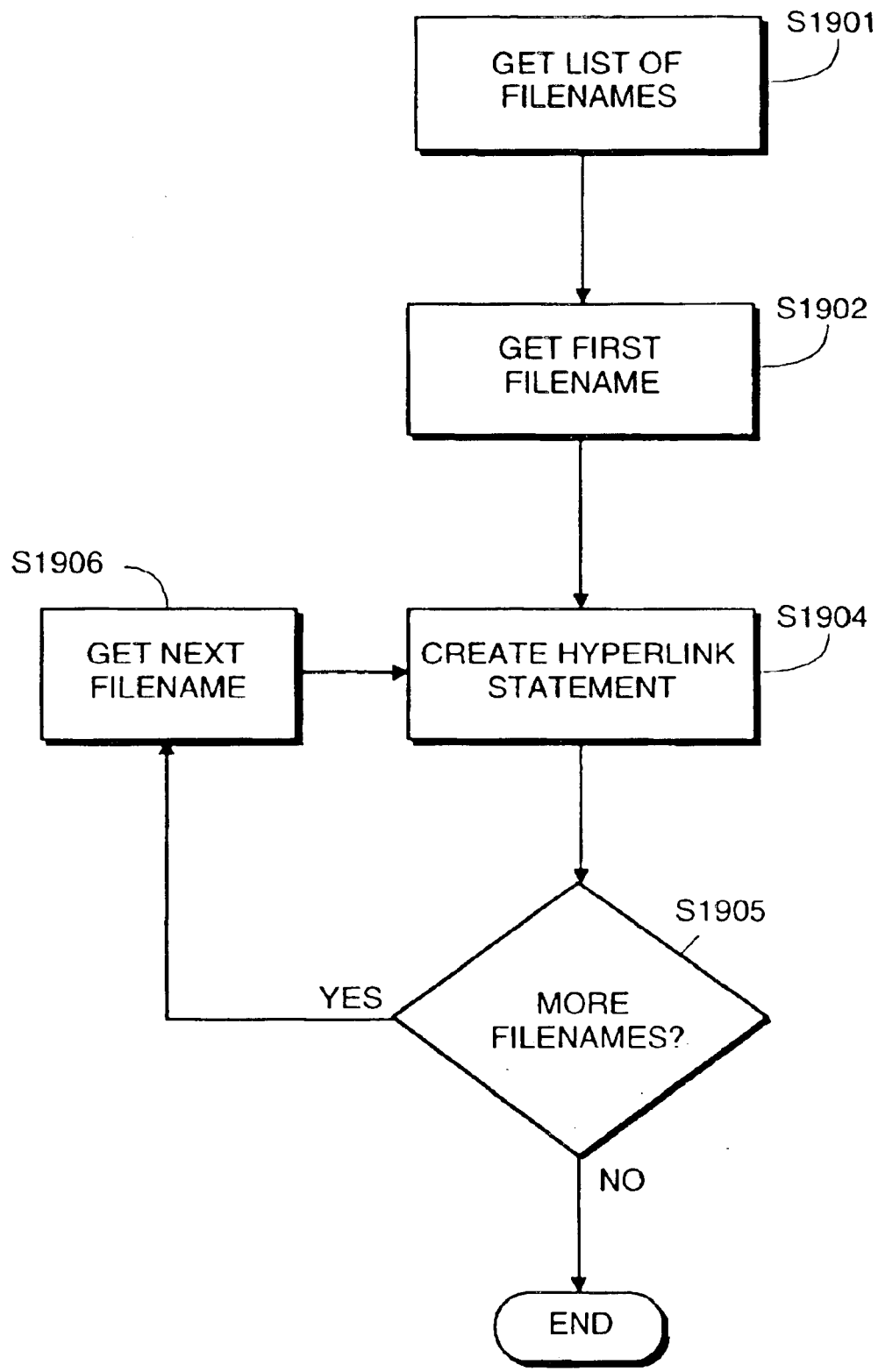
FIG. 19 is a flow diagram of computer-executable process steps to construct a server contents web page in accordance with the present invention.

In this regard, FIG. 19 is a flow diagram of computer-executable process steps to create a directory web page similar to that created by the FIG. 13 process steps but in the case of an FTP-enabled web site. The process steps are also preferably embodied in network expansion board 30. In the present example, the FIG. 19 process steps act on the FIG. 18 data.

Initially, in step S1901, the directory data is parsed to obtain a list of filenames therein. Next, in step S1902, a first filename is retrieved. A corresponding hyperlink statement is created in step S1904. The statement uses the following format: <A HREF="pdpbrowse.html? target_url=ftp://username:password®ftp.microsoft.com /./filename</A>.

If more filenames exist, flow continues from step S1905 to step S1906 to obtain a next filename and a new statement is created in step S1904. If no more filenames exist at step S1905, the process steps terminate. FIG. 20 shows HTML source code of a page created by applying the FIG. 19 process steps to the FIG. 18 data. As described with respect to FIG. 8, the page is delivered in step S809 and thereafter displayed as shown in FIG. 21.

Figure 21:
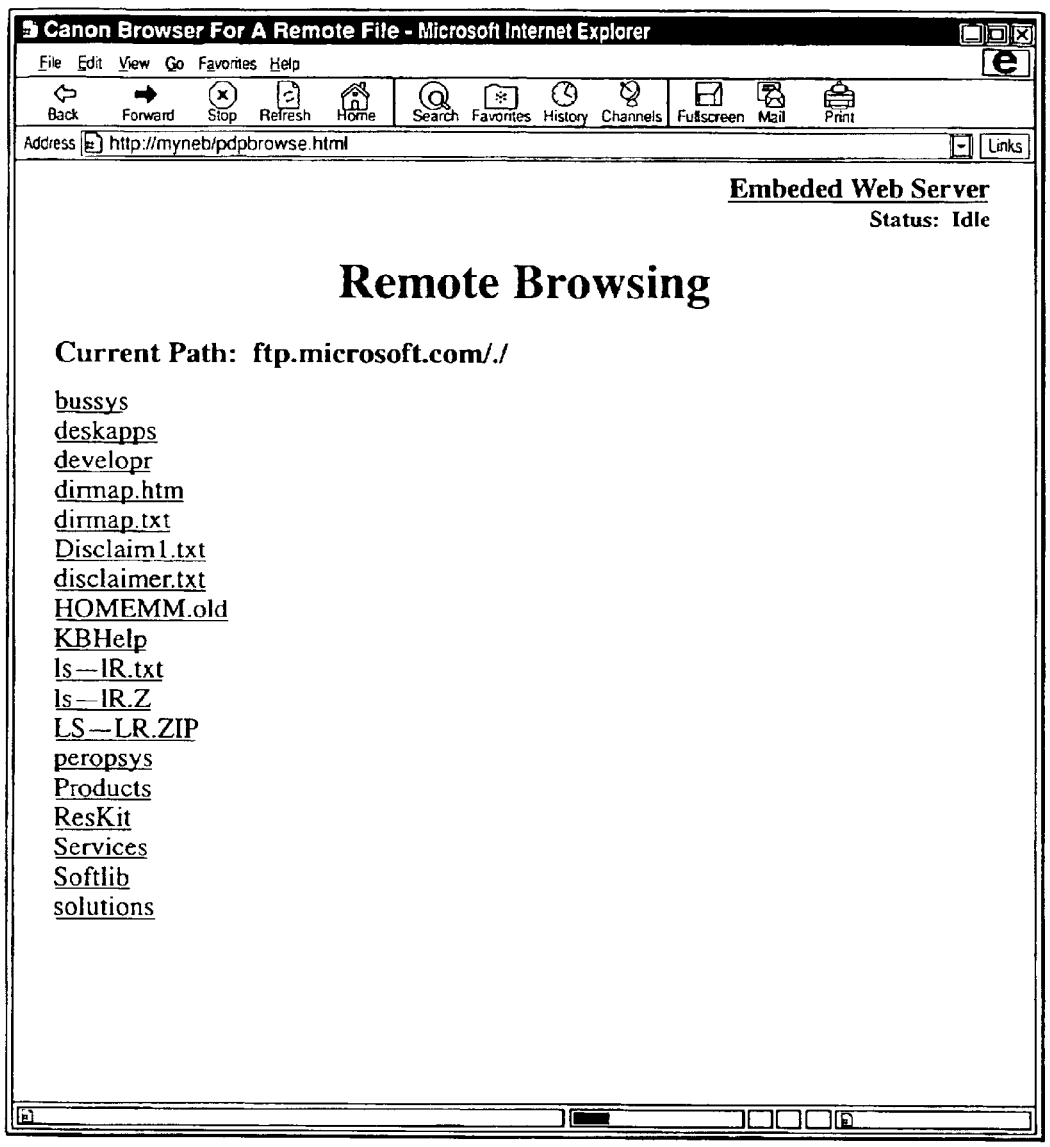
FIG. 21 is a view of a web page displayed by a web browser based on the FIG. 20 source code.
Figure 22:
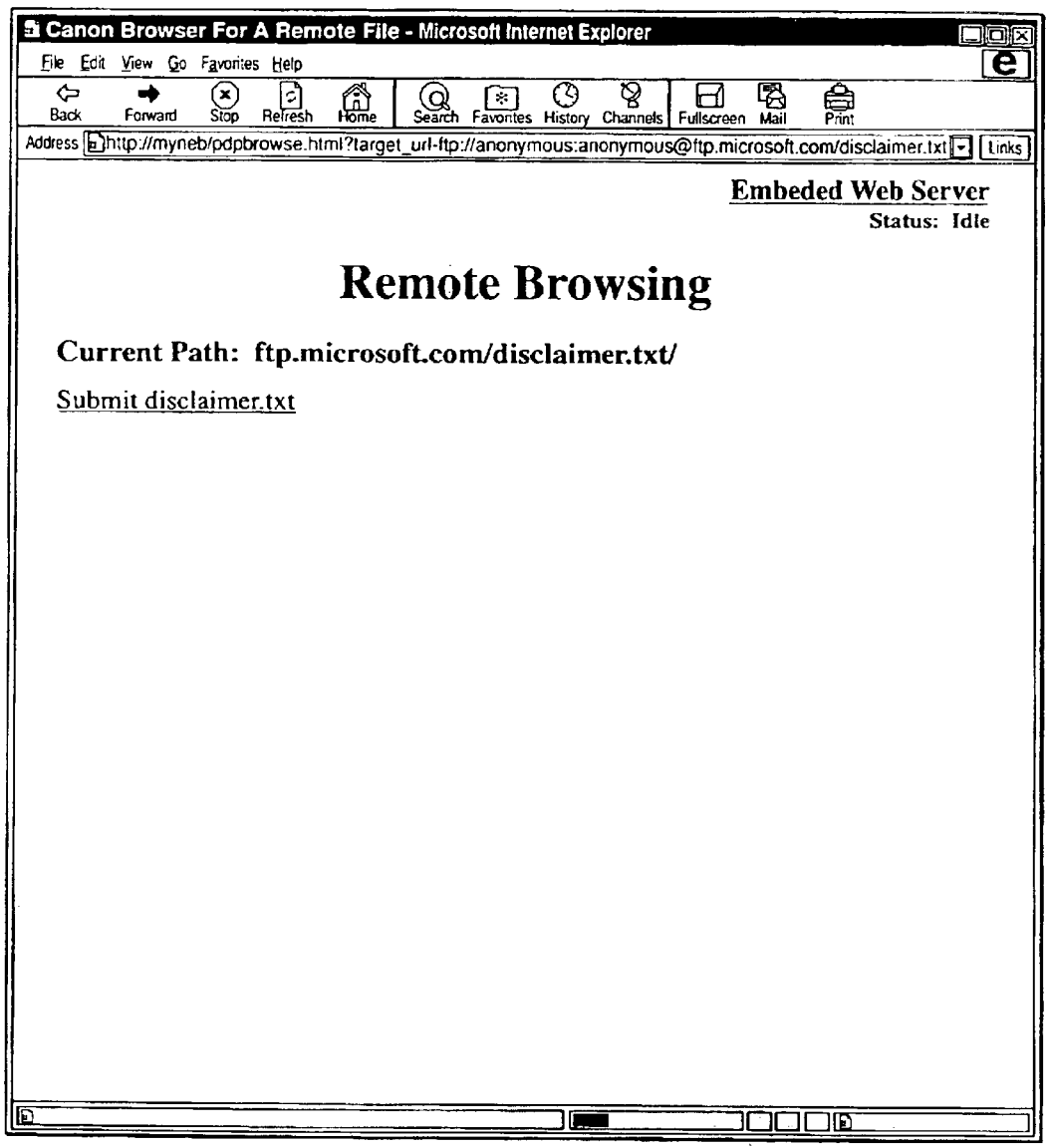
FIG. 22 is a view of a web page created in accordance with the present invention.

Upon selection of a link shown in FIG. 21, a target URL corresponding to the link, as defined by the FIG. 20 source code, is passed to with the URL of "pdpbrowse.htmlw" page 60 for browsing of a site corresponding to the target URL. It should be noted that PDP module 35 determines which protocol to use when browsing a site by referring to the target URL passed with the "pdpbrowse.html" URL. If the target URL does not correspond to a directory, a web page such as that shown in FIG. 22 is delivered in step S811 and the FIG. 8 process steps continue as described above.

Figure 23:
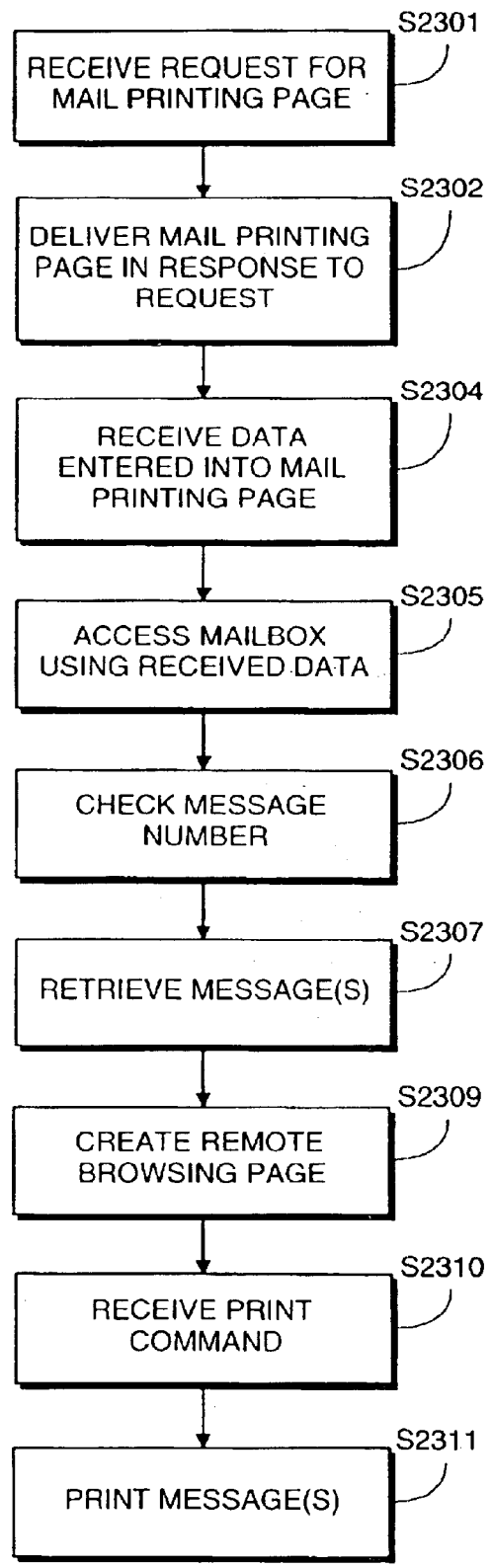
FIG. 23 is a flow diagram of computer-executable process steps to print electronic mail according to the present invention.

FIG. 23 is a flow diagram of computer-executable process steps to print electronic mail on a remote printer. The process steps are preferably embodied in expansion board 30.

Figure 24:
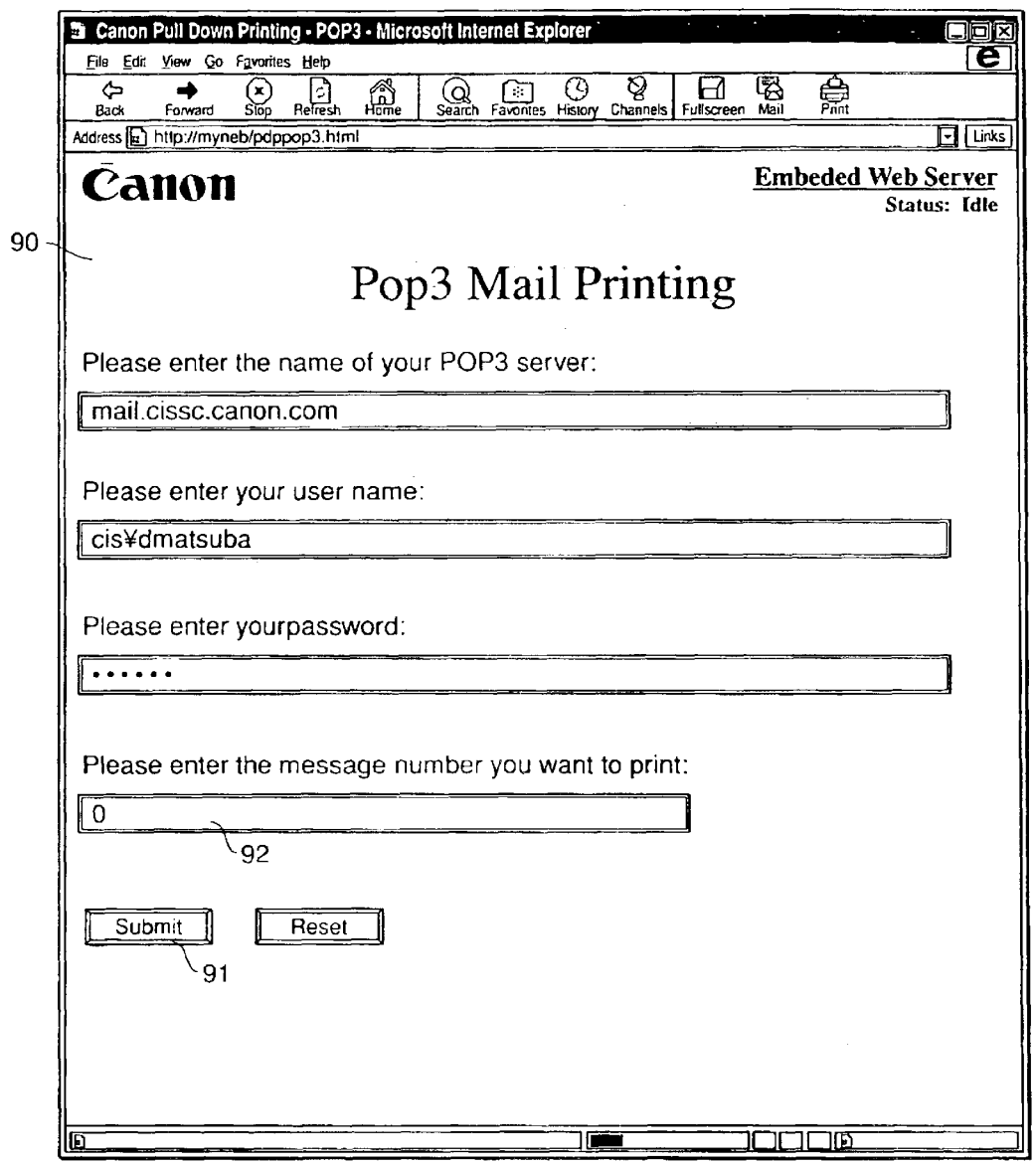
FIG. 24 is a view of a printer web page for use in printing electronic mail in accordance with the present invention.

A request for a mail printing web page is received in step S2301, as a result of a user entering an appropriate URL into a web browser. In response, a mail printing web page such as page 90 of FIG. 24 is delivered. As shown in FIG. 24, the appropriate URL corresponding to page 90 is http://myneb/pdppop3.html.

A user enters data into the fields shown on page 90 including a message number 92 that the user wants to view or print, and submits the data by selecting submit icon 91. It should be noted that a message number 92 of 0 indicates that the entire contents of the mailbox will be returned in browsable form, thus facilitating browsing of the mailbox. Once in browsing mode, the user can select a specific mail message and chose to view it or print it. The data is thereafter received in step S2304 by being passed as parameters to the "pdppop3.html" URL.

After reception of the data, a corresponding mailbox is accessed by PDP module 35 using the data and the POP3 protocol. Next, in step S2306, the "List" POP3 command is used to determine the number of messages in the corresponding mailbox and the number is checked against the message number received in step S2304. If the number of messages in the mailbox is less than the received number, an error web page is delivered requesting reentry of the message number to print. If not, flow continues to step S2307.

Figure 26:
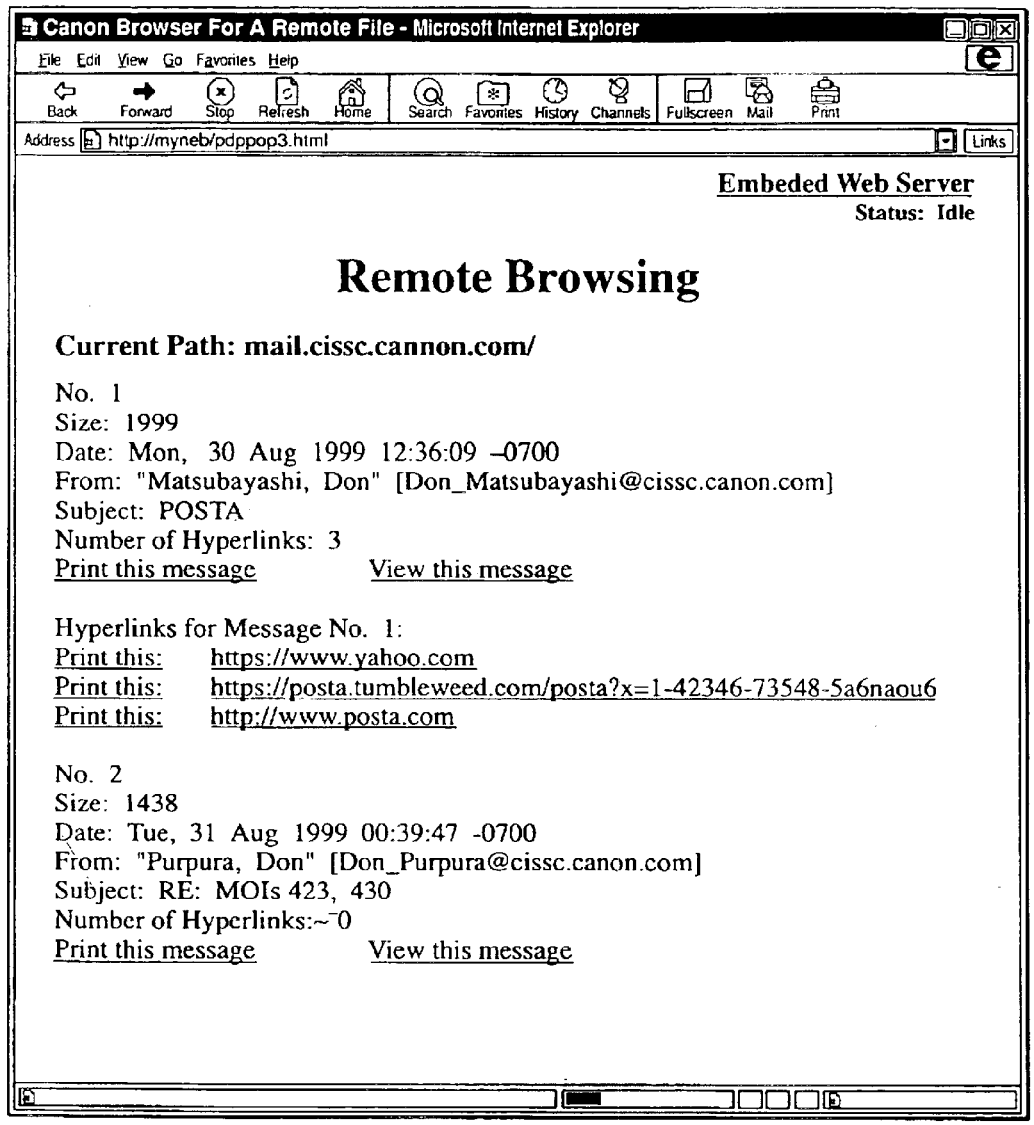
FIG. 26 is a view of a mail printing web page as displayed by a web browser based on the FIG. 25 source code.

In step S2307, headers of the specified message(s) is/are retrieved. If a message number of 0 was selected by the user to enter browsing mode, a web page is created in step S2309 to display the header data regarding the retrieved messages. If however, the user entered a specific mail message number, then the selected mail message will be printed and steps S2309 and S2310 are skipped. Source code for such a page is shown in FIG. 25. After the page is delivered, it is displayed on the user's browser as shown in FIG. 26. If a "Print this message" link is selected, a print command is received in step S2310. In response, PDP module 35 retrieves the corresponding message and delivers the message to printer controller 43 for printing in step S2311.

In an alternative embodiment, a user can use remote browsing page 60 to request printing of electronic mail. In this embodiment, a user enters a URL such as "pop3://user:password@mailserver /message number" to specify the data requested by web page 90. Then, when the URL is passed as a target_url parameter to the URL of page 60, PDP module 35 parses the necessary data from the target_url and flow continues from step S2305 as described above. One drawback to the foregoing embodiment is that the password data would be visible upon entry into page 60.

Although the present invention has been described with respect to what are currently considered to be its preferred embodiments, the invention should not be deemed to be limited thereto. Rather, the invention is intended to encompass all equivalent and obvious modifications and embodiments contained within the scope and spirit of the appended claims.

What is claimed is:

1. A control method for controlling a printer for providing print-by-reference functionality to a web browser, the method comprising the steps of:
   providing a web page from a printer's embedded web server to the web browser;
   receiving a URL entered into the provided web page by the web browser;
   creating a remote browsing web page based on contents of a website corresponding to the entered URL, the remote browsing web page including hypertext links;

selecting a hypertext link from the remote browsing web page;

issuing a directory access command corresponding to the selected hypertext link, wherein, if the command fails, the printer retrieves a document corresponding to the selected hypertext link from the website on the Internet, and wherein, if the command succeeds, a new web page is created having hypertext links;

if the issuance of the directory access command was successful, selecting a hypertext link from the new web page;

the printer retrieving a document to be printed corresponding to the hypertext link selected from the new web page from a website on the Internet; and the printer automatically printing the retrieved document.

2. Computer-executable process steps stored on a computer-readable medium, the steps to control a printer for providing print-by-reference functionality to a web browser, the steps comprising:

providing a web page from a printer's embedded web server to the web browser;

receiving a URL entered into the provided web page by the web browser;

creating a remote browsing web page based on contents of a website corresponding to the entered URL, the remote browsing web page including hypertext links;

selecting a hypertext link from the remote browsing web page;

issuing a directory access command corresponding to the selected hypertext link, wherein, if the command fails, the printer retrieves a document corresponding to the selected hypertext link from the website on the Internet, and wherein, if the command succeeds, a new web page is created having hypertext links;

if the issuance of the directory access command was successful, selecting a hypertext link from the new web page;

the printer retrieving a document to be printed corresponding to the hypertext link selected from the new web page from a web site on the Internet; and the printer automatically printing the retrieved document.

\* \* \* \* \*

UNITED STATES PATENT AND TRADEMARK OFFICE
CERTIFICATE OF CORRECTION

PATENT NO. : 6,938,202 B1  
APPLICATION NO. : 09/465835  
DATED : August 30, 2005  
INVENTOR(S) : Don Hideyasu Matsubayashi et al.

It is certified that error appears in the above-identified patent and that said Letters Patent is hereby corrected as shown below:

ON THE ITEM PAGE  
Item (56) References Cited, U.S. PATENT DOCUMENTS, insert:  
--6,049,821 A    04-2000    Theriault et al.  
   6,212,564 B1    04-2001    Harter et al.  
   6,327,045 B1    12-2001    Teng et al.--

COLUMN 4  
Line 19, "executing" should read --executed--.

COLUMN 6  
Line 66, "c/A>." should read --</A>.--

COLUMN 7  
Line 45, "username:password®ftp.microsoft.com" should read  
--username:password@ftp.microsoft.com--; and  
Line 56, "to" should be deleted and ""pdpbrowse.htmlw"" should read  
--pdpbrowse.html"--.

Signed and Sealed this

Eleventh Day of December, 2007

JON W. DUDAS  
*Director of the United States Patent and Trademark Office*